(12) United States Patent
Rusanovskyy et al.

(10) Patent No.: US 11,985,346 B2
(45) Date of Patent: May 14, 2024

(54) ENCODING HIGH DYNAMIC RANGE VIDEO DATA

(71) Applicant: QUALCOMM Incorporated, San Diego, CA (US)

(72) Inventors: Dmytro Rusanovskyy, San Diego, CA (US); Cheng-Teh Hsieh, Del Mar, CA (US); Wei-Jung Chien, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/933,744

(22) Filed: Sep. 20, 2022

(65) Prior Publication Data

US 2024/0098293 A1    Mar. 21, 2024

(51) Int. Cl.
| | |
|---|---|
| *H04N 19/463* | (2014.01) |
| *H04N 9/64* | (2023.01) |
| *H04N 19/132* | (2014.01) |
| *H04N 19/136* | (2014.01) |
| *H04N 19/169* | (2014.01) |
| *H04N 19/184* | (2014.01) |
| *H04N 19/186* | (2014.01) |
| *H04N 19/85* | (2014.01) |

(52) U.S. Cl.
CPC ............ *H04N 19/463* (2014.11); *H04N 9/64* (2013.01); *H04N 19/132* (2014.11); *H04N 19/136* (2014.11); *H04N 19/184* (2014.11); *H04N 19/186* (2014.11); *H04N 19/1887* (2014.11); *H04N 19/85* (2014.11)

(58) Field of Classification Search
CPC .. H04N 19/463; H04N 19/132; H04N 19/136; H04N 19/184; H04N 19/186
See application file for complete search history.

(56) References Cited

U.S. PATENT DOCUMENTS

| | | | |
|---|---|---|---|
| 2017/0111643 A1* | 4/2017 | Bugdayci Sansli | H04N 19/184 |
| 2017/0272690 A1* | 9/2017 | Seifi | G06T 5/009 |
| 2017/0324959 A1 | 11/2017 | Olivier et al. | |
| 2020/0322622 A1 | 10/2020 | Minoo et al. | |

(Continued)

OTHER PUBLICATIONS

HDR10+ Technologies, LLC "HDR10+ System Whitepaper", Sep. 4, 2019, pp. 1-14.

(Continued)

*Primary Examiner* — On S Mung
(74) *Attorney, Agent, or Firm* — Shumaker & Sieffert, PA

(57) ABSTRACT

An example device for encoding high dynamic range (HDR) video data includes a memory configured to store video data; and one or more processors implemented in circuitry and configured to: calculate a histogram for an image of the video data, the image being expressed in a linear light format; encode values for the histogram of the image expressed in the linear light format; and encode the image. Data for the histogram may be expressed in an array of variables having a size of $2^{10} \times 18$ bits. The device may encode codewords representing values for bins of the histogram, where the codewords may be selected from a set of codewords for a PQ10 format for HDR images. The bins of the histogram may represent non-equal width ranges.

18 Claims, 12 Drawing Sheets

(56) References Cited

U.S. PATENT DOCUMENTS

2021/0211738 A1 7/2021 Yin et al.

OTHER PUBLICATIONS

ITU-R Recommendation BT.2020-2: "Parameter Values for Ultra-High Definition Television Systems for Production and International Programme Exchange", ITU-R BT.2020-2, Oct. 2015, 8 Pages.

ITU-R Recommendation BT.2100-2, "Image Parameter Values for High Dynamic Range Television for Use in Production and International Programme Exchange", Jul. 2018, 16 pages.

ITU-R Recommendation BT.709-6, "Parameter Values for the HDTV Standards for Production and International Programme Exchange", Itu-R BT.709-6, Jun. 2015, 19 Pages.

ITU-T H.265, Series H: Audiovisual and Multimedia Systems, Infrastructure of Audiovisual Services—Coding of Moving Video, Advanced Video Coding for Generic Audiovisual Services, The International Telecommunication Union, Oct. 2014, 540 pp.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

ITU-T T.35, "Series T: Terminals for Telematic Services, Procedure for the Allocation of ITU-T Defined Codes for Non-Standards Facilities", The International Telecommunication Union, Feb. 2000, 15 pp.

"SMPTE ST 2094-40:2016: Dynamic Metadata for Color Volume Transform- Application #4," SMPTE ST 2094-40:201x, Jun. 13, 2016, 26 pp.

"SMPTE Standard for Motion-Picture Film (8-mm TypeR)—Camera Aperture Image and Usage", SMPTE 231-2004, Society of Motion Picture Television Engineers, Nov. 8, 2004, 4 pages.

SMPTE Standard, "High Dynamic Range Electro-Optical Transfer Function of Mastering Reference Displays", SMPTE ST 2084:2014, The Society of Motion Picture and Television Engineers, Aug. 16, 2014, XP055225088, pp. 1-14, ISBN: 978-1-61482-829-7.

Francois E., et al., "Suggested New Draft Text of Signalling, Backward Compatibility and Display Adaptation for HDR/WCG Video Coding", 26th JCT-VC Meeting, 20170112-20170120, Geneva, (Joint Collaborative Team on Video Coding of ISO/IEC JTC1/SC29/WG11 and ITU-T SG 16 WP3), No. JCTVC-Z0023, Mar. 7, 2017, pp. 1-31, XP030242225, Sections 6.2.1 to 6.3.4.3.

International Search Report and Written Opinion—PCT/US2023/031025—ISA/EPO—Dec. 5, 2023.

* cited by examiner

ENCODING HIGH DYNAMIC RANGE VIDEO DATA

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for coding (encoding and decoding) high dynamic range (HDR) video data. In order to encode HDR video data, statistics are calculated for one or more pictures of the HDR video data, e.g., one or more histograms. In general, a histogram includes a plurality of bins, each bin representing a range of possible luminance and/or chrominance values and having a value indicating a number of samples within the range of possible luminance and/or chrominance values. A picture of video data may be represented in a variety of different formats, such as red-green-blue (RGB) format or luminance and chrominance (e.g., YUV or YCbCr, representing luminance, blue-hue chrominance, and red-hue chrominance) format. Thus, the histogram may be calculated in one of the various formats for the picture, which is not necessarily the same as the format used when encoding the picture.

This disclosure recognizes that calculating a histogram for a picture of HDR video data expressed in a linear light (LL) RGB format may be more efficient, in terms of memory storage for the histogram, than calculating the histogram for the picture using PQ10 format. For example, whereas the PQ10 format may require a look-up table of size $2^{16}*16$ bits, the look-up table for the LL RGB format may have a size of $2^{10}*18$ bits. Accordingly, per the techniques of this disclosure, a video encoding system for encoding HDR video data may calculate the histogram for one or more pictures in LL RGB format.

In one example, a method of encoding high dynamic range (HDR) video data, includes calculating a histogram for an image of video data, the image being expressed in a linear light format; extracting one or more parameters of the histogram; encoding the one or more parameters of the histogram of the image expressed in the linear light format; and encoding the image.

In another example, a device for encoding high dynamic range (HDR) video data includes a memory configured to store histogram data; and one or more processors implemented in circuitry and configured to: calculate a histogram for an image of video data, the image being expressed in a linear light format; extract one or more parameters of the histogram; encode the one or more parameters of the histogram of the image expressed in the linear light format; and encode the image.

In another example, a device for encoding high dynamic range (HDR) video data includes means for calculating a histogram for an image of video data, the image being expressed in a linear light format; means for extracting one or more parameters of the histogram; means for encoding the one or more parameters of the histogram of the image expressed in the linear light format; and means for encoding the image.

In another example, a computer-readable storage medium is encoded with instructions that, when executed, cause a programmable processor to calculate a histogram for an image of video data, the image being expressed in a linear light format; extract one or more parameters of the histogram; encode the one or more parameters of the histogram of the image expressed in the linear light format; and encode the image.

The details of one or more examples are set forth in the accompanying drawings and the description below. Other features, objects, and advantages will be apparent from the description, drawings, and claims.

DETAILED DESCRIPTION

Figure 1:
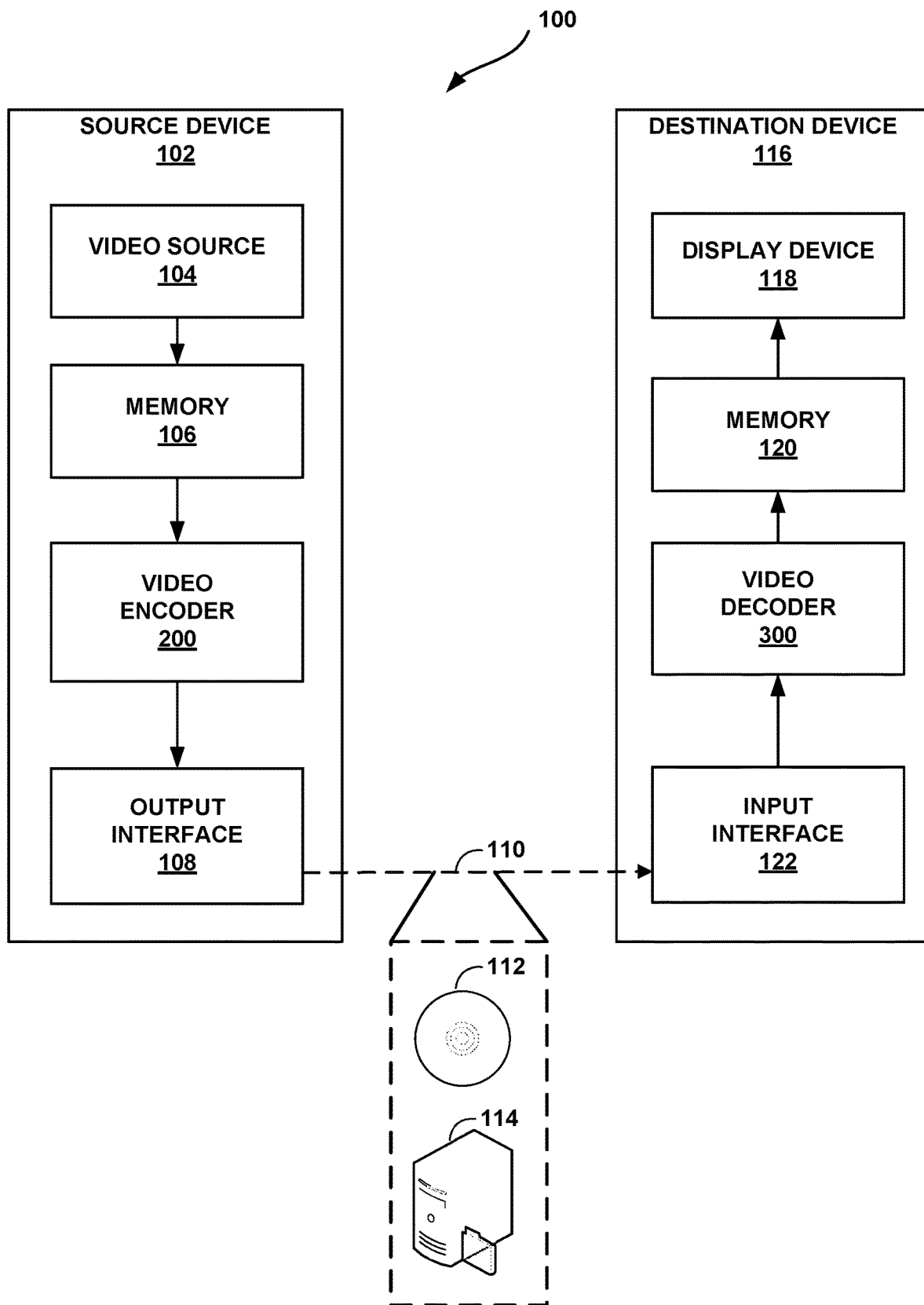
FIG. 1 is a block diagram illustrating an example video encoding and decoding system that may perform the techniques of this disclosure.

The techniques of this disclosure relate to coding (encoding and decoding) high dynamic range (HDR) video data. When encoding HDR data, a video encoder may compute statistics of one or more images, such as histograms of the images, in addition to encoding the images. The video encoder may thus encode both the images themselves as well as the statistics data. In some cases, the images may be expressed in various formats. For example, the images may be captured in a red-green-blue (RGB) format and then converted to a luminance and chrominance (e.g., YUV or YCbCr, representing luminance, blue hue chrominance, and red hue chrominance).

Some video applications may operate with video data representing captured scenery with HDR and wide color gamut (WCG). Parameters of a utilized dynamic range and color gamut are two independent attributes of video content, and their specification for purposes of digital television and multimedia services are defined by several international standards. For example, ITU-R Rec. 709 defines parameters for HDTV, such as Standard Dynamic Range and standard color gamut, and ITU-R Rec.2020 specifies ultra high definition television (UHDTV) parameters such as High Dynamic Range and wide color gamut. There are also other standards developing organization (SDO) documents specifying these attributes in other systems, e.g. P3 color gamut is defined in SMPTE-231-2 and some parameters of HDR are defined STMPTE-2084.

Dynamic range is typically defined as a ratio between minimum and maximum brightness of a video signal. Dynamic range is also measured in terms of "f-stops," where the difference between one f-stop and another corresponds to a doubling of the signal dynamic range. The Moving Picture Experts Group (MPEG) defines High Dynamic Range content as such content that features a brightness variation with more than 16 f-stops. In some cases, levels between 10 and 16 f-stops are considered as intermediate dynamic range, but may be considered HDR in other definitions. At the same time, the human visual system is capable of perceiving much larger dynamic range. However, the human visual system includes an adaptation mechanism to narrow the so called simultaneous range.

ITU-R Rec.709 describes standard definition range (SDR), which typically supports a range of brightness (or luminance) of around 0.1 to 100 candelas (cd) per m2 (often referred to as "nits"), leading to less than 10 f-stops. Next generation video services are expected to provide dynamic range of up to 16 f-stops. Although a detailed specification is currently under development, some initial parameters have been specified in SMPTE-2084 and ITU-R Rec.2020.

Another aspect for more realistic video experiences besides HDR is the color dimension, which is conventionally defined by the color gamut. An SDR color gamut may be visualized as a triangle based on the BT.709 color red, green, and blue color primaries. WCG is based on BT.2020 red, green, and blue color primaries and includes a so-called spectrum locus, delimited by a tongue-shaped area representing limits of natural colors. Moving from BT.709 to BT.2020 color primaries aims to provide UHDTV services with about 70% more colors. A white color may also be specified. Table 1 below provides examples of various color gamut specifications of colorimetry parameters for example color spaces:

TABLE 1

| | RGB color space parameters | | | | | | | |
|---|---|---|---|---|---|---|---|---|
| | White point | | Primary colors | | | | | |
| Color space | xw | yw | $x_R$ | $y_R$ | $x_G$ | $y_G$ | $x_B$ | $y_B$ |
| DCI-P3 | 0.314 | 0.351 | 0.680 | 0.320 | 0.265 | 0.690 | 0.150 | 0.060 |
| ITU-R BT.709 | 0.3127 | 0.3290 | 0.64 | 0.33 | 0.30 | 0.60 | 0.15 | 0.06 |
| ITU-R BT.2020 | 0.3127 | 0.3290 | 0.708 | 0.292 | 0.170 | 0.797 | 0.131 | 0.046 |

Images of video data are typically encoded in YUV format. For conventional HDR encoding, there has been a conventional expectation of computing histograms for images in an R'G'B' P3/Perceptual Quantizer (PQ) format. The images are first converted from a linear light RGB format to the PQ format, e.g., PQ10, according to a PQ optical-electrico transfer function (OETF). Calculating histograms for images in the PQ10 format images requires the use of a look-up table (LUT) of size $2^{16}*16$ bits.

This disclosure recognizes that a smaller LUT, e.g., of size $2^{10}*18$ bits, can be used if the histogram were instead calculated from the linear light formatted images. Likewise, the conversion from linear light RGB to PQ10 need not be performed in order to calculate the histogram from the linear light formatted images. As such, calculating the histogram using the linear light RGB format images may reduce processing operations, reduce latency, and reduce memory consumption for storing the LUT.

Thus, according to the techniques of this disclosure, a histogram calculation unit, which may be incorporated into the video encoder or may be separate from the video encoder, may calculate a histogram for one or more images of HDR video data expressed in linear light format. When calculating the histogram, the histogram calculation unit may divide the possible range of sample values (luminance and/or chrominance values) into sub-ranges, corresponding to bins of the histogram. The sub-ranges need not necessarily be, but may be, the same width for each of the bins. That is, some sub-ranges may have the same width, while other sub-ranges may have different widths. In some examples, all of the sub-ranges may have the same width. In some examples, all of the sub-ranges may have different respective widths. The histogram calculation unit may initialize each of the bin values to zero. The histogram calculation unit may then iterate through samples of one or more of the images. The histogram calculation unit may determine the sub-range containing the value of the current sample and then increment the bin value corresponding to the determined sub-range.

After computing the bin values of the histogram, the histogram calculation unit (or video encoder) may encode the bin values, e.g., using codewords. In some examples, the histogram calculation unit may determine the codewords for the bin values from a subset of the PQ10 codewords of conventional HDR video coding techniques.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or nonvolatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component may be an array or single sample from one of the three arrays (luma and two chroma) for a picture in 4:2:0, 4:2:2, or 4:4:4 color format, or an array or a single sample of the array for a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2:
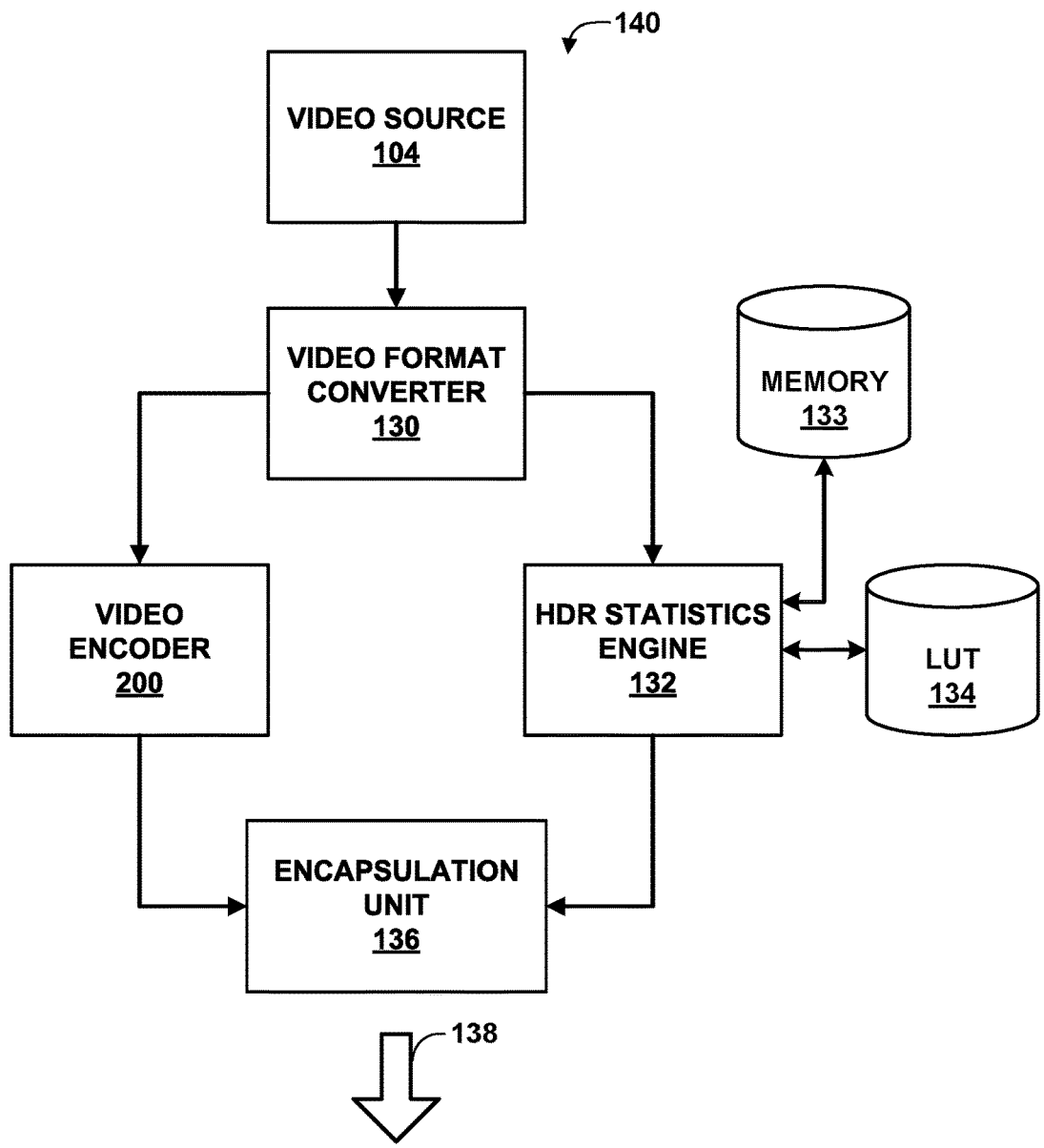
FIG. 2 is a block diagram illustrating an example high dynamic range (HDR) video encoding system according to the techniques of this disclosure.

FIG. 2 is a block diagram illustrating an example high dynamic range (HDR) video encoding system 140 according to the techniques of this disclosure. HDR video encoding system 140 may be incorporated into source device 102 of FIG. 1.

In this example, HDR video encoding system 140 includes video source 104, video format converter 130, video encoder 200, HDR statistics engine 132, memory 133, look-up table (LUT) 134, and encapsulation unit 136. As discussed with respect to FIG. 1, video source 104 may generally capture and/or generate video data, i.e., raw, uncoded video data. The raw, uncoded video data may be in a red-green-blue (RGB) format.

Video format converter 130 is generally configured to convert the raw, uncoded video data from video source 104 to one or more of a variety of different formats. For example, video format converter 130 may convert the raw, uncoded video data to a luminance and chrominance (YUV or YCbCr) format for encoding by video encoder 200. According to the techniques of this disclosure, video format converter 130 may convert the raw, uncoded video data from video source 104 to a linear light (LL) format, such as RGB LL16.

HDR statistics engine 132 may calculate a histogram from one or more images in the LL format. HDR statistics engine 132 may store values for the histogram to memory 133. HDR statistics engine 132 may use LUT 134 to calculate the histogram. In general, LUT 134 may map sample values of the images to index values, where index values correspond to bins of the histogram. LUT 134 may be an array of constants having a size of $2^{10} \times 16$ bits. In one example, HDR statistics engine 132 may calculate an index value as follows:

maxRGB=max (R, G, B), 16 bits P3 LL
if (maxRGB<2)
   index=maxRGB
else {
   index1=LUT1 (log 2(maxRGB))
   index2=isEqual(maxRGB, within LUT2(log 2(maxRGB))
   index=index1+index2
} where "index" represents the index value corresponding to a bin of the histogram, and max (R, G, B) returns a maximum of the values of collocated samples of each of the red, green, and blue color component images of the current image (e.g., maxRGB). HDR statistics engine 132 may calculate the histogram in an array of variables having a size of $2^{10} \times 18$.

HDR statistics engine 132 may increment the value of the bin of the histogram corresponding to the determined index value. For example, HDR statistics engine 132 may perform a "hist[index]++" operation, where "hist[index]" represents a bin of the histogram and the "++" operator increments the value of the corresponding bin by one. The search complexity involved in obtaining the bin index may be O(10), as there may be 10 comparators per calculation of maxRGB. The search may be a binary search, e.g., of a binary search tree.

After calculating the values of the bins of the histogram, HDR statistics engine 132 may determine codewords for the bin values. The codewords may be selected from the same set of codewords as that for histograms calculated using PQ10 formatted images. For example, HDR statistics engine 132 may select the codewords from the set of codewords for the PQ10 format for HDR images. As another example, HDR statistics engine 132 may initially form a strict subset of possible codewords from the set of codewords for the PQ10 format for HDR images, then select the codeword from the formed subset. The histogram bins need not necessarily represent uniform widths of values of the LL format.

This disclosure recognizes that PQ/linear light defines pixel brightness of samples in a range of 0 to 10,000 nits. HDR10+ specifies signaling of parameters up to candela per square meter ($cd/m^2$). PQ10 has 1024 codewords to cover a range of possible values, with granularity of 0.1 $cd/m^2$. Thus, the histogram computed in PQ10 domain is suboptimal for HDR10+. By contrast, per the techniques of this disclosure, HDR statistics engine 132 may instead calculate the histogram in RGB P3 linear light domain. The quality of the HDR10 histogram in the PQ10 domain can be achieved with fewer than 1023 bins in the linear light domain. The histogram index can be computed with a value dependent downscaling and right-shifting. For example, HDR statistics engine 132 may perform the following:

Calculate N Ranges: TS[N]
For example, N may be 1023 or fewer.
In some examples, N may be as low as 650.
Processing Flow:
Compare linear maxRGB values against TS[i].
Derive range index through binary search or analytical process.
The range index serves as histogram index hi=function (maxRGB, TS[i])
histLinRGB [hi]++
Hardware Implication:
TS LUT: N×18 bits
Histogram: 1024×18 bits (i.e., $2^{10}$×18 bits)
Binary search over LUT fragments (up to 40 LUT entries)

Video encoder 200 may encode each of the images used to calculate the histogram. Encapsulation unit 136 may encapsulate the encoded images (e.g., encoded slices of the images) as well as the encoded histogram (e.g., the determined codewords or encoded versions of the codewords) from HDR statistics engine 132. Ultimately, encapsulation unit 136 may form bitstream 138 including data for the encoded images and the encoded histogram.

Each of video format converter 130, HDR statistics engine 132, and encapsulation unit 136 may be implemented in one or more processing units, that is, one or more hardware-based processors implemented in circuitry. For example, the processing units may include one or more circuits or logic elements as part of hardware circuitry, or as part of a processor, ASIC, or FPGA. Memory 133 and LUT 134 may correspond to a variety of storage devices, such as dynamic random access memory (DRAM), including synchronous DRAM (SDRAM), magnetoresistive RAM (MRAM), resistive RAM (RRAM), solid state storage devices, or other types of memory devices.

In this manner, video encoding system 140 represents an example of a device for encoding high dynamic range (HDR) video data, including a memory configured to store histogram data; and one or more processors implemented in circuitry and configured to: calculate a histogram for an image of video data, the image being expressed in a linear light format; encode values for the histogram of the image expressed in the linear light format; and encode the image.

Figure 3:
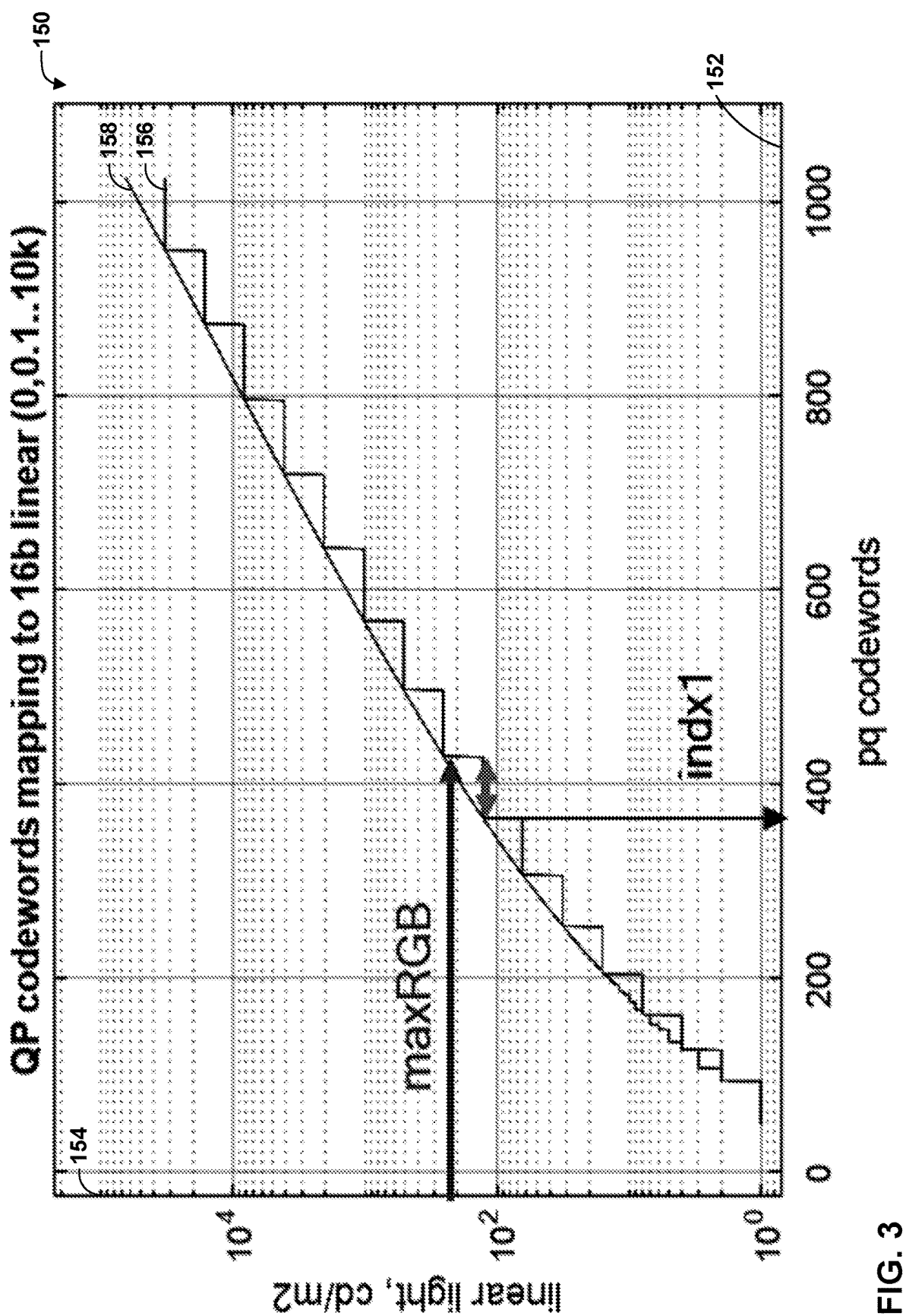
FIG. 3 is a graph illustrating an example set of bins for a histogram to be calculated according to the techniques of this disclosure.

FIG. 3 is a graph 150 illustrating an example set of bins for a histogram to be calculated according to the techniques of this disclosure. X-axis 152 represents possible index values for the bins, while Y-axis 154 represents possible maxRGB values. Step-wise function 156 approximates curve 158. Curve 158 represents codewords of PQ10, while step-wise function 156 represents codewords calculated from maxRGB using linear light format per the techniques of this disclosure.

As can be seen, different steps of step-wise function 156 have different widths. For example, ranges for steps of step-wise function 156 near the left side of graph 150 are narrower than steps of step-wise function 156 near the right side of graph 150 as shown in FIG. 3. Therefore, a first range of possible maxRGB values may be mapped to a single bin of the histogram, and a second range of possible maxRGB values may be mapped to a different bin of the histogram, where the second range may be wider than the first range.

Figure 4:
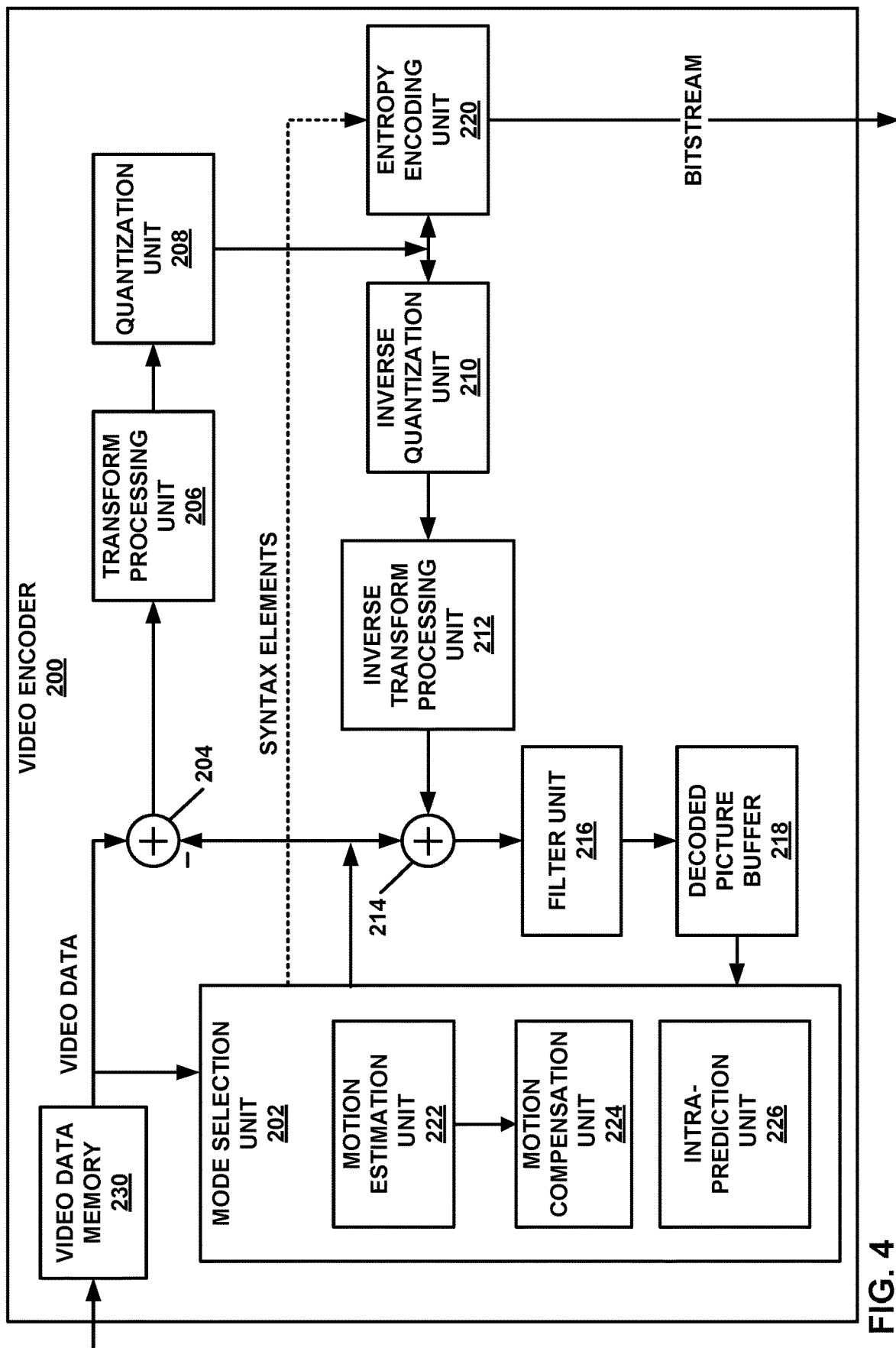
FIG. 4 is a block diagram illustrating an example video encoder that may perform video encoding in accordance with the techniques of this disclosure.

FIG. 4 is a block diagram illustrating an example video encoder 200 that may perform video encoding in accordance with the techniques of this disclosure. FIG. 4 is provided for purposes of explanation and should not be considered limiting of the techniques as broadly exemplified and described in this disclosure. For purposes of explanation, this disclosure describes video encoder 200 according to the techniques of VVC (ITU-T H.266, under development) and HEVC (ITU-T H.265). However, the techniques of this disclosure may be performed by video encoding devices that are configured to other video coding standards and video coding formats, such as AV1 and successors to the AV1 video coding format.

In the example of FIG. 4, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), solid state storage devices, or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 4 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 5:
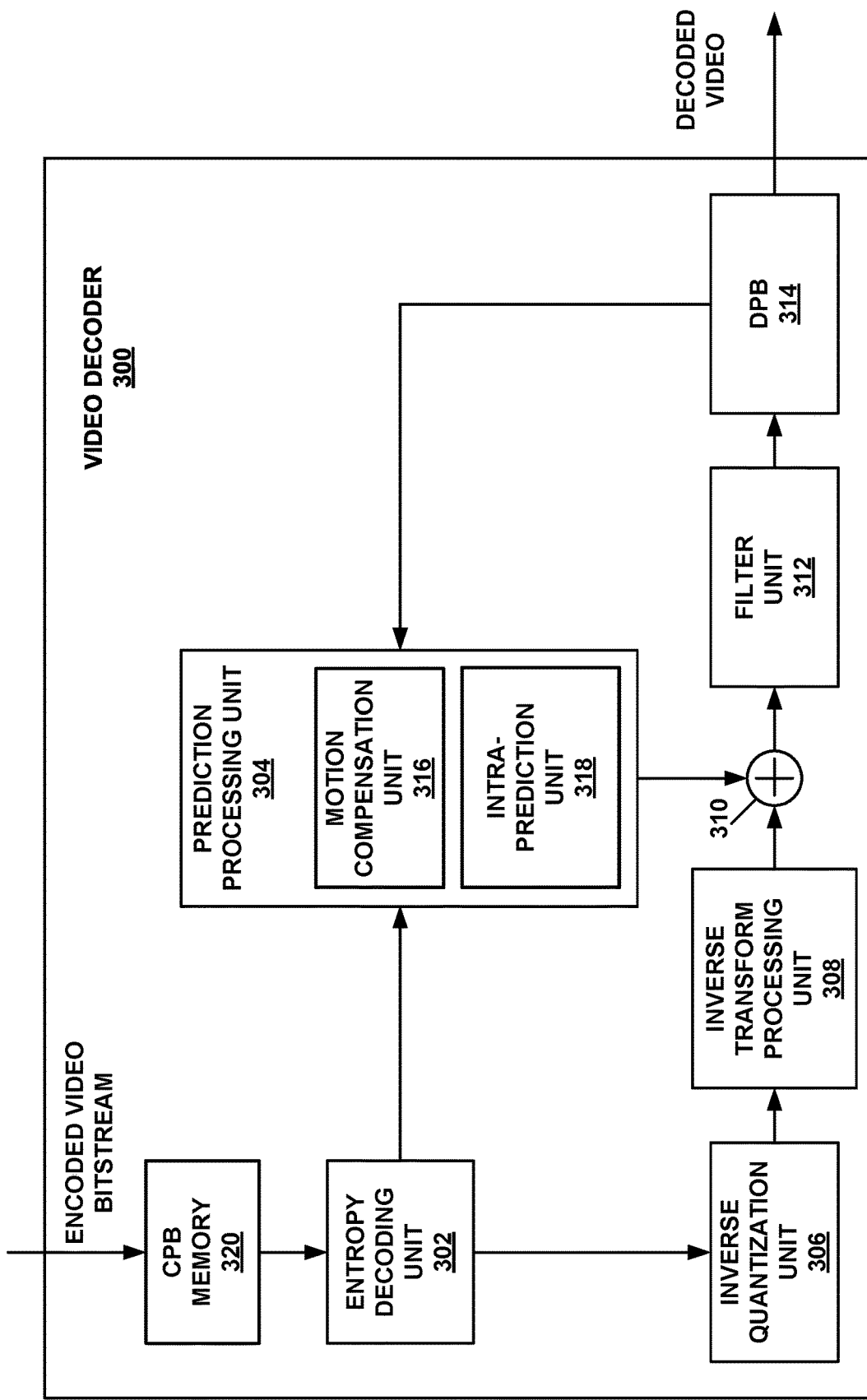
FIG. 5 is a block diagram illustrating an example video decoder that may perform video decoding in accordance with the techniques of this disclosure.

FIG. 5 is a block diagram illustrating an example video decoder 300 that may perform video decoding in accordance with the techniques of this disclosure. FIG. 5 is provided for purposes of explanation and is not limiting on the techniques as broadly exemplified and described in this disclosure. For purposes of explanation, this disclosure describes video decoder 300 according to the techniques of VVC (ITU-T H.266, under development) and HEVC (ITU-T H.265). However, the techniques of this disclosure may be performed by video coding devices that are configured to other video coding standards.

In the example of FIG. 5, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, compensation unit 316 may be configured to decode coding blocks of video data (e.g., both luma and chroma coding blocks) using translational motion compensation, affine motion compensation, OBMC, and/or compound inter-intra prediction, as described above. Intra prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), solid state storage devices, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 5 are illustrated to assist with understanding the operations performed by video decoder 300. The units may be implemented as fixed-function circuits, programmable circuits, or a combination thereof. Similar to FIG. 4, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 4).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 4). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

Figure 6:
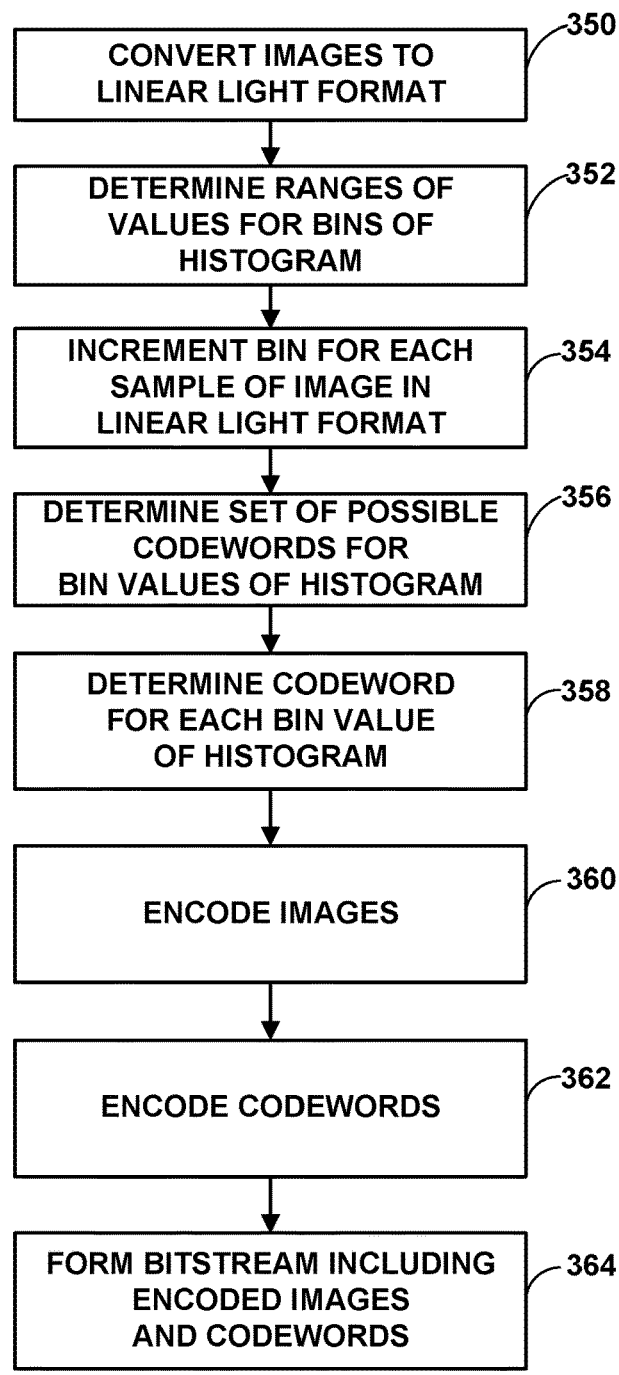
FIG. 6 is a flowchart illustrating an example method for encoding images and histogram data according to the techniques of this disclosure.

FIG. 6 is a flowchart illustrating an example method for encoding images and histogram data according to the techniques of this disclosure. The method of FIG. 6 is explained with respect to video encoding system 140, including HDR statistics engine 132, of FIG. 2. However, other devices or systems may be configured to perform this or a similar method.

Initially, video format converter 130 may convert one or more images to linear light format (350). HDR statistics engine 132 may then determine ranges of values for bins of a histogram (352) to be calculated for the one or more images. For example, the ranges may correspond to the steps of step-wise function 156 of FIG. 4.

HDR statistics engine 132 may calculate the histogram, including incrementing bins for each sample of the images in linear light format (354). For example, as discussed above, HDR statistics engine 132 may calculate a max of samples of red, green, and blue components of the images, and use the max to determine a corresponding bin of the histogram, then increment the value of the bin by one. HDR statistics engine 132 may perform this operation for each sample of each of the images.

HDR statistics engine 132 may also determine a set of possible codewords for bin values of the histogram (356). As explained above, the set of possible codewords for the histogram calculated from LL format images may be selected from PQ10 format codewords, e.g., as a subset of the PQ10 format codewords. After having calculated the histogram and determined the set of possible codewords, HDR statistics engine 132 may determine codewords for each bin value of the histogram (358).

Video encoder 200 may also encode the images (360), e.g., as explained above with respect to FIGS. 1 and 4. For example, video encoder 200 may partition the images into blocks and predictively encode each block using, e.g., intra- or inter-prediction. After predicting a block, video encoder 200 may calculate residual blocks representing differences between the original blocks and the predicted blocks. Video encoder 200 may further encode the residual blocks, including transforming the residual blocks to transform-domain blocks and quantizing the transform coefficients. Video encoder 200 may then entropy encode syntax element values for the quantized transform coefficients and prediction information.

HDR statistics engine 132 may also encode the codewords for the bin values of the histogram (362). For example, HDR statistics engine 132 may entropy encode the codewords in a manner similar to that of entropy encoding unit 220 of FIG. 4. Alternatively, HDR statistics engine 132 may pass the codewords to video encoder 200 to be entropy encoded by entropy encoding unit 220. Ultimately, encapsulation unit 136 may form bitstream 138 including the encoded images and codewords (364).

In this manner, the method of FIG. 6 represents an example of a method of encoding high dynamic range (HDR) video data, including calculating a histogram for an image of video data, the image being expressed in a linear light format; encoding values for the histogram of the image expressed in the linear light format; and encoding the image.

Figure 7A:
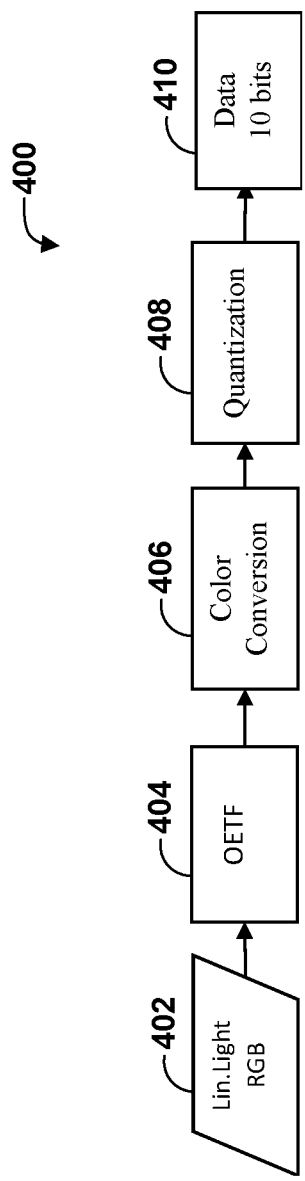
FIGS. 7A and 7B are conceptual diagrams illustrating examples of HDR and WCG representation conversion.
Figure 7B:
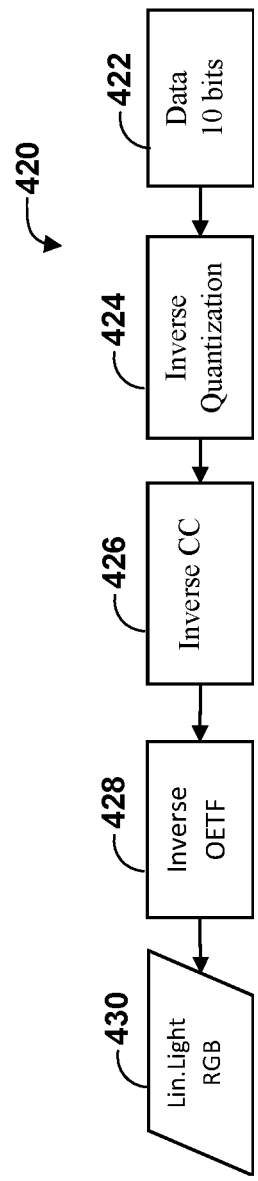

FIGS. 7A and 7B are conceptual diagrams illustrating examples of HDR and WCG representation conversion. In particular, FIG. 7A depicts an example encoder-side representation conversion process 400, while FIG. 7B depicts an example decoder-side representation conversion process. HDR/WCG is typically acquired in liner light and stored at a high precision per component (e.g., RGB 16 bits fixed or even floating point representation), and a very wide color space (BT.2020). This representation targets high precision and is (almost) mathematically lossless. However, this format feature a lot of redundancies and is not optimal for compression purposes. A lower precision format with HVS-based assumption is typically utilized for state-of-the-art video applications.

Typically, HDR video data format conversion, for purposes of compression, includes three major elements: a non-linear transfer function (TF) for dynamic range compacting (e.g., BT.2100 PQ or BT.2100 HLG), color conversion to a more compact or robust color space (e.g., P3), and floating point to integer representation conversion/quantization (e.g., 10 bit fixed point representation).

In the example of FIG. 7A, video data is initially presented in linear light RGB format 402. As noted above, the HDR/WCG conversion process generally includes three stages. In the example of FIG. 7A, the three stages include optical-electrico transfer function (OETF) stage 404, color conversion stage 406, and quantization stage 408. These three stages process the video data in linear light RGB format 402 to produce data in 10-bit representation 410. In one example, the video data in linear light RGB format 402 may have a high dynamic range. This high dynamic range of input RGB data may be represented in linear and floating point representations. Non-linear OETF stage 404 may compact the high dynamic range, e.g., using a QP TF as defined in BT.2100 or SMPTE-2084. Color conversion stage 406 may convert the RGB representation to a target color space, such as YCbCr. Quantization stage 408 may quantize the sample values to achieve an integer representation.

In the example of FIG. 7B, video data represented in 10 bits 422 is initially received. The three stages in this example include inverse quantization stage 424, inverse color conversion stage 426, and inverse OETF stage 428. These three stages process the video data represented in 10 bits 422 to reproduce video data in linear light RGB format 430.

The order of these elements is given as an example and may vary in real-world applications. For example, color conversion may precede the TF module. In some examples, additional processing may be performed, such as spatial subsampling applied to color components.

Figure 8:
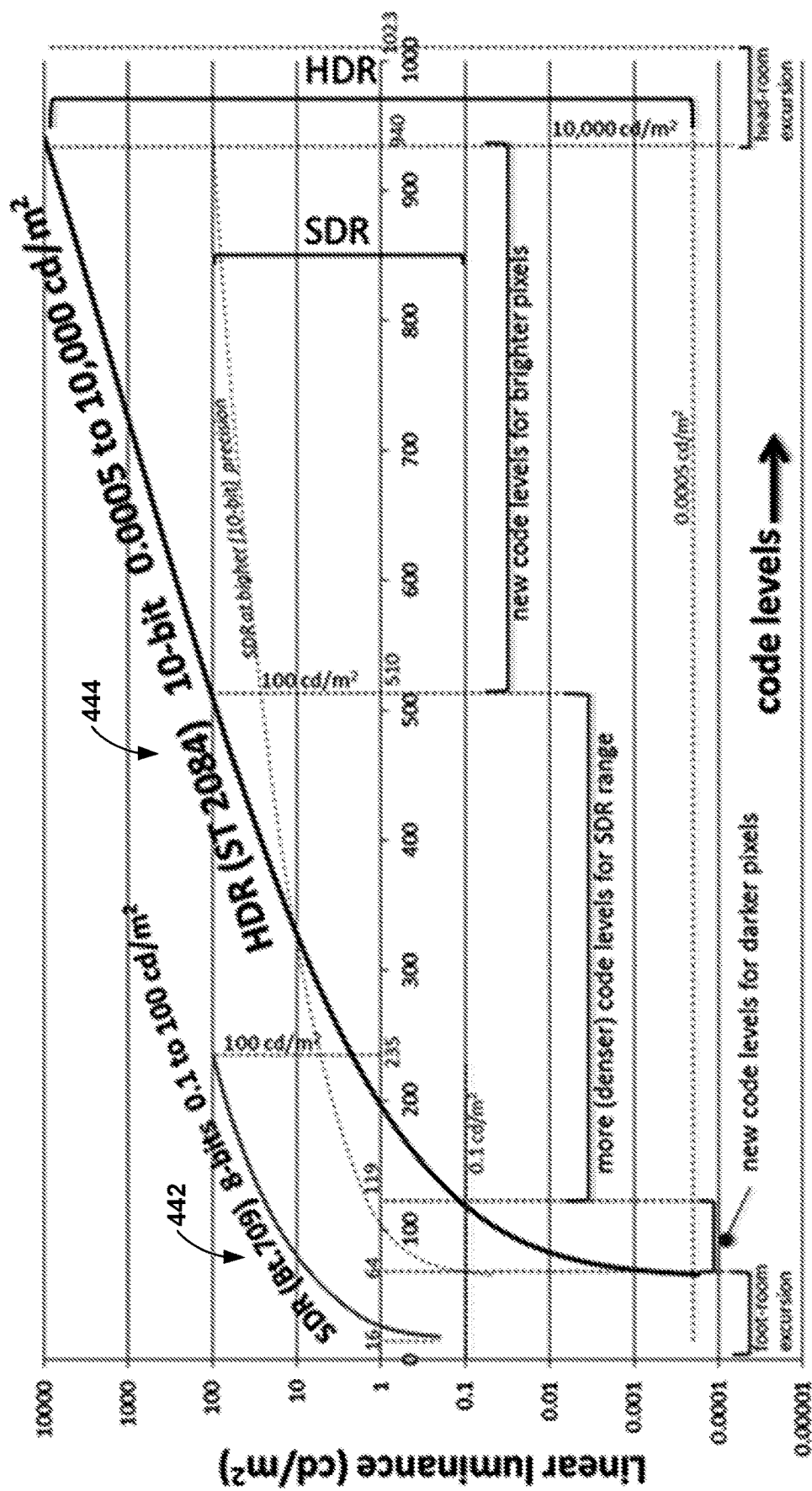
FIG. 8 is a graph illustrating various examples of transfer functions.

FIG. 8 is a graph illustrating various examples of transfer functions. In particular, FIG. 8 depicts example SDR transfer function 442 and example HDR transfer function 444. A transfer function (TF) is applied to video data to compact the dynamic range of the video data and make it possible to represent the video data with a limited number of bits. This function is typically a one-dimensional (1D) non-linear function reflecting either an inverse of an electro-optical transfer function (EOTF) of an end-user display, as specified for SDR in Rec.709. For HDR signals, one of the most popular formats is defined by Opto-Electronic Transfer Function (OETF), approximating the human visual system (HVS) perception to brightness changes as for PQ TF specified in BT.2100 (also SMPTE-2084) for HDR. The inverse process of the OETF is the EOTF (electro-optical transfer function), which maps the code levels back to luminance. This non-linearity is a foundation for PQ10, HDR10, Dolby Vision, and HDR10+ video formats.

The specification of the PQ transfer function is defined in ST 2084 as the EOTF. Its inverse, the OETF, is applied to a normalized linear R, G, B values, which results in a non-linear representation of R'G'B'. PQ defines normalization by NORM=10000, which is associated with a peak brightness of 10000 nits (cd/m2). For the purpose of this disclosure, this nonlinearity is called PQ_OETF. The non-linearity may be defined as follows:

$$R' = PQ\_OETF(\max(0, \min(R/NORM, 1)))$$

$$G' = PQ\_OETF(\max(0, \min(G/NORM, 1)))$$

$$B' = PQ\_OETF(\max(0, \min(B/NORM, 1)))$$

with $PQ\_OETF(L) = \left(\frac{c_1 + c_2 L^{m_1}}{1 + c_3 L^{m_1}}\right)^{m_2}$ (1)

○ $m_1 = \frac{2610}{4096} \times \frac{1}{4} = 0.1593017578125$

○ $m_2 = \frac{2523}{4096} \times 128 = 78.84375$

○ $c_1 = c_3 - c_2 + 1 = \frac{3424}{4096} = 0.8359375$

○ $c_2 = \frac{2413}{4096} \times 32 = 18.8515625$

○ $c_3 = \frac{2392}{4096} \times 32 = 18.6875$

Figure 9:
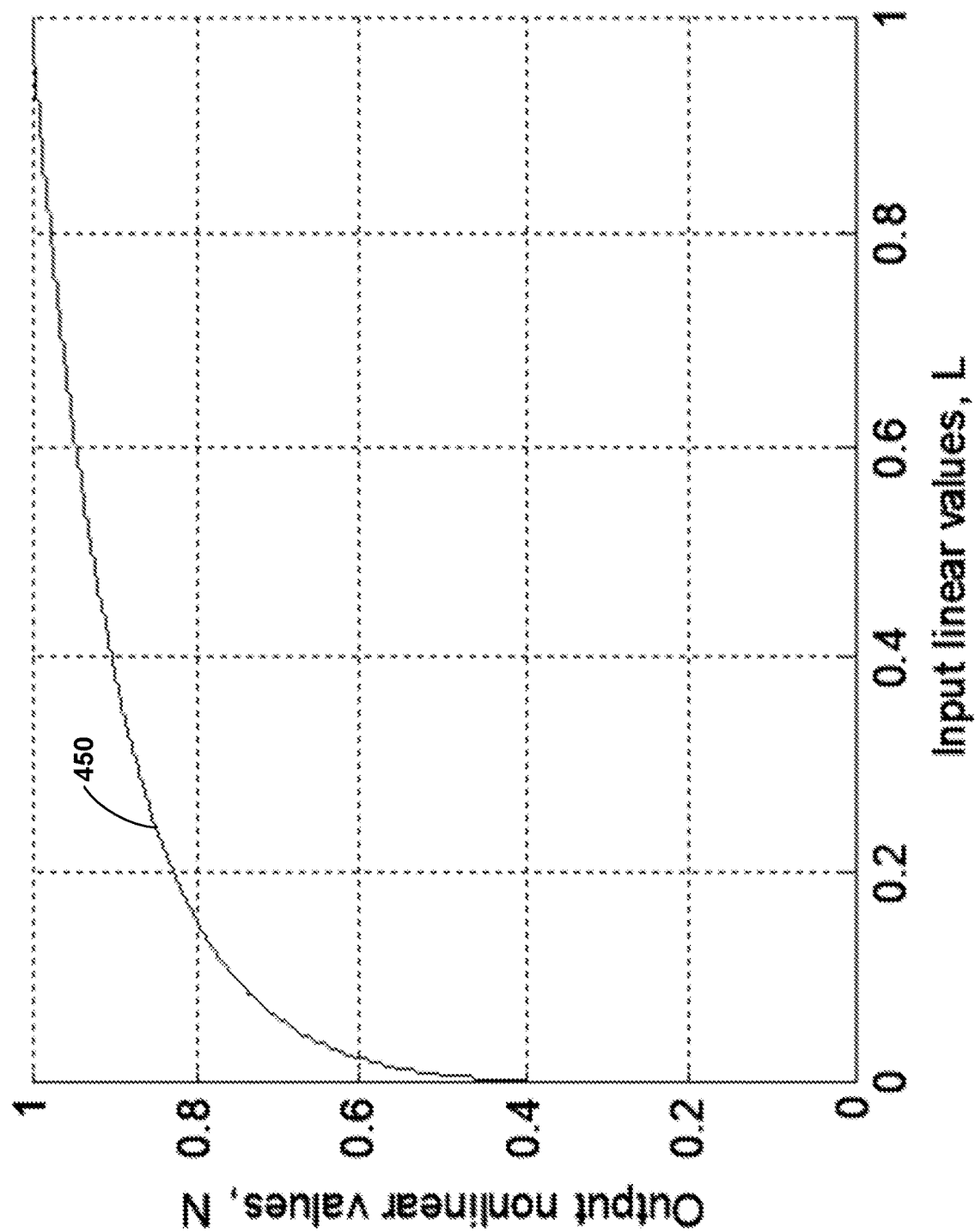
FIG. 9 is a graph illustrating an example PQ OETF.

FIG. 9 is a graph 450 illustrating an example PQ OETF. The example of FIG. 9 represents a visualization of PQ OETF using input values (linear color value) normalized to a range of 0 . . . 1 and normalized output values (nonlinear color value). As seen from graph 450, a relatively small number of low illumination values of dynamical range of the input signal is converted to 50% of the dynamical range of the output signal.

PQ EOTF, specified in ST2084, may be defined as follows:

• $R = 10000 * PQ\_EOTF(R')$ (2)

• $G = 10000 * PQ\_EOTF(G')$

• $B = 10000 * PQ\_EOTF(B')$

• With $PQ\_EOTF(N) = \left(\frac{\max\left[(N^{1/m_2} - c_1), 0\right]}{c_2 - c_3 N^{1/m_2}}\right)^{1/m_1}$ ○ $m_1 = \frac{2610}{4096} \times \frac{1}{4} = 0.1593017578125$ ○ $m_2 = \frac{2523}{4096} \times 128 = 78.84375$ ○ $c_1 = c_3 - c_2 + 1 = \frac{3424}{4096} = 0.8359375$ ○ $c_2 = \frac{2413}{4096} \times 32 = 18.8515625$ ○ $c_3 = \frac{2392}{4096} \times 32 = 18.6875$ With floating point accuracy, sequential application of EOTF and OETF provides a perfect reconstruction without errors. However, this representation is not optimal for streaming or broadcasting services. A more compact representation with fixed bits accuracy of nonlinear R'G'B' data is described below.

RGB data is typically used as input, because RGB data is generated from image capturing sensors. However, the RGB color space has a high redundancy among its components and is not optimal for compact representation. To achieve a more compact and more robust representation, RGB components are typically converted to a more uncorrelated color space more suitable for compression, e.g., YCbCr. This color space separates the brightness in the form of luminance and color information in different un-correlated chrominance components, e.g., red and blue hue components.

For modern video coding systems, a typically used colour space is YCbCr, as specified in ITU-R BT.709 or ITU-R BT.709. The YCbCr colour space in BT.709 standard speci-fies the following conversion process from R'G'B' to Y'CbCr (non-constant luminance representation):

• $Y' = 0.2126 * R' + 0.7152 * G' + 0.0722 * B'$ (3)

• $Cb = \frac{B' - Y'}{1.8556}$

• $Cr = \frac{R' - Y'}{1.5748}$

The above can also be implemented using the following approximate conversion that avoids the division for the Cb and Cr components:

$Y'=0.212600*R'+0.715200*G'+0.072200*B'$ $Cb=-0.114572*R'-0.385428*G'+0.500000*B'$ $Cr=0.500000*R'-0.454153*G'-0.045847*B'$ (4)

The ITU-R BT.2020 standard specifies the following conversion process from R'G'B' to Y'CbCr (non-constant luminance representation):

• $Y' = 0.2627 * R' + 0.6780 * G' + 0.0593 * B'$ (5)

• $Cb = \frac{B' - Y'}{1.8814}$

• $Cr = \frac{R' - Y'}{1.4746}$

The above can also be implemented using the following approximate conversion that avoids the division for the Cb and Cr components:

$Y'=0.262700*R'+0.678000*G'+0.059300*B'$ $Cb=-0.139630*R'-0.360370*G'+0.500000*B'$ $Cr=0.500000*R'-0.459786*G'-0.040214*B'$ (6)

Both color spaces may remain normalized. Thus, for the input values normalized in the range 0 . . . 1, the resulting values will be mapped to the range 0 . . . 1. Generally, color transforms implemented with floating point accuracy provide perfect reconstruction, thus this process may be lossless.

The color transform and non-linear transform function processing stages described above may be implemented using floating point accuracy representations. As such, these processes may be realized losslessly. However, this type of accuracy can be considered redundant and expensive for most consumer electronics applications. For such services, input data in a target color space may be converted to a target bit-depth fixed point accuracy. Certain studies show that 10 to 12 bits accuracy in combination with the PQ TF is sufficient to provide HDR data of 16 f-stops with distortion below the Just-Noticeable Difference. Data represented with 10 bits accuracy can be further coded with most of the state-of-the-art video coding solutions. This conversion process includes signal quantization and is an element of lossy coding and is a source of inaccuracy introduced to converted data.

An example of such quantization applied to code words in target color space is described below. In this example, YCbCr is shown. Input values YCbCr represented in floating point accuracy may be converted into a signal of fixed bit-depth BitDepthY for the Y value and BitDepthC for the chroma values (Cb, Cr):

$$D_Y = \text{Clip1}_Y(\text{Round}((1 << (\text{BitDepth}_Y - 8)) * (219 * Y' + 16)))$$

$$D_{Cb} = \text{Clip1}_C(\text{Round}((1 << (\text{BitDepth}_C - 8)) * (224 * Cb + 128)))$$

$$D_{Cr} = \text{Clip1}_C(\text{Round}((1 << (\text{BitDepth}_C - 8)) * (224 * Cr + 128))) \quad (7)$$

With:
Round(x)=Sign(x)*Floor(Abs(x)+0.5)
Sign (x)=−1 if x<0, 0 if x=0, 1 if x>0
Floor(x) the largest integer less than or equal to x
Abs(x)=x if x>=0, −x if x<0
Clip1$_Y$(x)=Clip3(0, (1<<BitDepth$_Y$)−1, x)
Clip1$_C$(x)=Clip3(0, (1<<BitDepth$_C$)−1, x)
Clip3(x,y,z)=x if z<x, y if z>y, z otherwise There are several HDR10 (PQ) based systems that employ dynamic metadata. Most of the HDR dynamic metadata currently used is specified in the SMPTE ST 2094 suite of documents. These documents specify four different color volume transforms (mapping functions). Each color volume transform (CVT) is published as a separate ST 2094-xx document, with xx equal to −10 for CVT 1, −20 for CVT 2, −30 for CVT 3 and −40 for CVT 4. Details on the HDR parameters of CVT 4, defined in ST 2094-40 (SMPTE: "Dynamic Metadata for Color Volume Transformation—Application #4," Doc. ST 2094-40 (2016), Society of Motion Picture and Television Engineer, White Plains, NY), are provided below.

The metadata of SMPTE ST 2094-40 can be classified as syntax elements falling into three groups. The first is for identification purposes, the second describes statistical characteristics of the video signal, and the third describes a basis OOTF (optical-optical transfer function) for a producer-specified target peak luminance. This basis OOTF can be used to construct the guided OOTF, which defines the adaptation to the presentation display.

Metadata elements associated with identification are not used for image processing. These elements include, as defined in SMPTE ST 2094-40:
itu_t_t35 country code: itu_t_t35 country code shall be a byte having a value specified as a country code by Rec. ITU-T T.35 Annex A [59]. The value shall be 0xB5.
itu_t_t35_terminal_provider_code: itu_t_t35 terminal_provider_code shall be a
fixed 16-bit field. The value shall be 0x003C.
itu_t_t35 terminal_provider_oriented_code:
itu_t_t35 terminal_provider_oriented_code shall be a 16-bit code. The value shall be as specified in Table 149 in SMPTE ST 2094-40.
CVT identifier (also referred to as "application identifier"): application identifier identifies an application (CVT) and its defining document in ST-2094 suite. application identifier may be set to 4.

Metadata elements associated with statistical characteristics include:
maxscl[w][i]: specifies the maximum of the i-th color component of linearized RGB values in the w-th processing window in the scene. The value of maxscl[w][i] shall be in the range of 0 to 1, inclusive and in multiples of 0.00001. maxscl[w][0], maxscl[w][1], and maxscl[w][2] are corresponding to R, G, B color components respectively.

average_maxrgb[w]: specifies the average of linearized maxRGB values in the w-th processing window in the scene. The value of average_maxrgb[w] shall be in the range of 0 to 1, inclusive and in multiples of 0.00001.
num_distributions [w]
num_distributions_maxrgb_percentiles [w]: indicates the number of linearized maxRGB values at given percentiles in the w-th processing window in the scene. The maximum value of num_distribution_maxrgb_percentiles [w] shall be 15.
distribution_index[w][i]
distribution_values[w][i]
distribution_maxrgb_percentages[w][i]: specifies an integer percentage value corresponding to the ith percentile linearized RGB value in the w-th processing window in the scene. The value of distribution_maxrgb_percentages[w][i] shall be in the range of 0 to 100, inclusive.
distribution_maxrgb_percentiles[w][i]: specifies the linearized maxRGB value at the i-th percentile in the w-th processing window in the scene. The value of distribution_maxrgb_percentiles[w][i] shall be in the range of 0 to 1, inclusive and in multiples of 0.00001.
fraction_bright_pixels[w]: specifies the fraction of selected pixels in the image that contains the brightest pixel in the scene. The value of fraction_bright_pixels[w] shall be in the range of 0 to 1, inclusive and in multiples of 0.001.

Metadata elements associated with the basis OOTF include:
targeted_system_display_maximum_luminance: specifies the nominal maximum display luminance of the targeted system display, in units of 1 candelas per square meter. The value of targeted_system_display_maximum_luminance shall be in the range of 0 to 10000, inclusive.
tone_mapping_flag[w] equal to 1 indicates that the metadata for the tone mapping function in the w-th processing window is present.
knee_point_x[w] specifies the x coordinate of the separation point between the linear part and the curved part of the tone mapping function. The value of
knee_point_x[w][i] shall be in the range of 0 to 1, excluding 0 and in multiples of 1/4095.
knee_point_y[w] specifies the y coordinate of the separation point between the linear part and the curved part of the tone mapping function. The value of
knee_point_y[w][i] shall be in the range of 0 to 1, excluding 0 and in multiples of 1/4095.
num_bezier_curve_anchors [w] indicates the number of the intermediate anchor parameters of the tone mapping function in the w-th processing window. The maximim value of num_bezier_curve_anchors [w] shall be 15.
bezier_curve_anchors[w][i] specifies the i-th intermediate anchor parameter of the tone mapping function in the w-th processing window in the scene. The value of bezier_curve_anchors[w][i] shall be in the range of 0 to 1, inclusive and in multiples of 1/1023.

According to the techniques of this disclosure, these various metadata elements may be referred to as parameters of a histogram, any or all of which may be extracted and encoded by HDR statistics engine 132 (FIG. 2).

The HDR10+ system specification is based on ST 2094-40 and further constrains values of the syntax elements (HDR10+ TECHNICAL SPECIFICATION Part 1: Metadata and Devices, version 1.6, HDR10+ Technologies LLC, December 2021). The following constrains are imposed on the syntax elements of describing statistical characteristics of the video:

distribution_index[w][i] SHALL be set as in Table 2.
distribution_values[w][i] SHALL be set as in Table 2. distribution_values[w][i] SHALL be in the range of 0-100 or 255 for (i=2). Otherwise (i=0,1,3 . . . 8), distribution_values[w][i] SHALL be in the range of 0x00000-0x186A0. distribution_values[w][i] for (i=0-1, 3-8) SHALL be multiplied by 10. The values of distribution_values[w][i] for (i=0-1, 3-8) SHALL be divided by 10 when processing the HDR10+ metadata.

TABLE 2

| [i] | distribution_index[w][i] | distribution_values[w][i] |
|---|---|---|
| 0 | 1 | 1% percentile linearized maxRGB value * 10 |
| 1 | 5 | DistributionY99 * 10 |
| 2 | 10 | DistributionY100nit |
| 3 | 25 | 25% percentile linearized maxRGB value * 10 |
| 4 | 50 | 50% percentile linearized maxRGB value * 10 |
| 5 | 75 | 75% percentile linearized maxRGB value * 10 |
| 6 | 90 | 90% percentile linearized maxRGB value * 10 |
| 7 | 95 | 95% percentile linearized maxRGB value * 10 |
| 8 | 99 | 99.98% percentile linearized maxRGB value * 10 |

Figure 10:
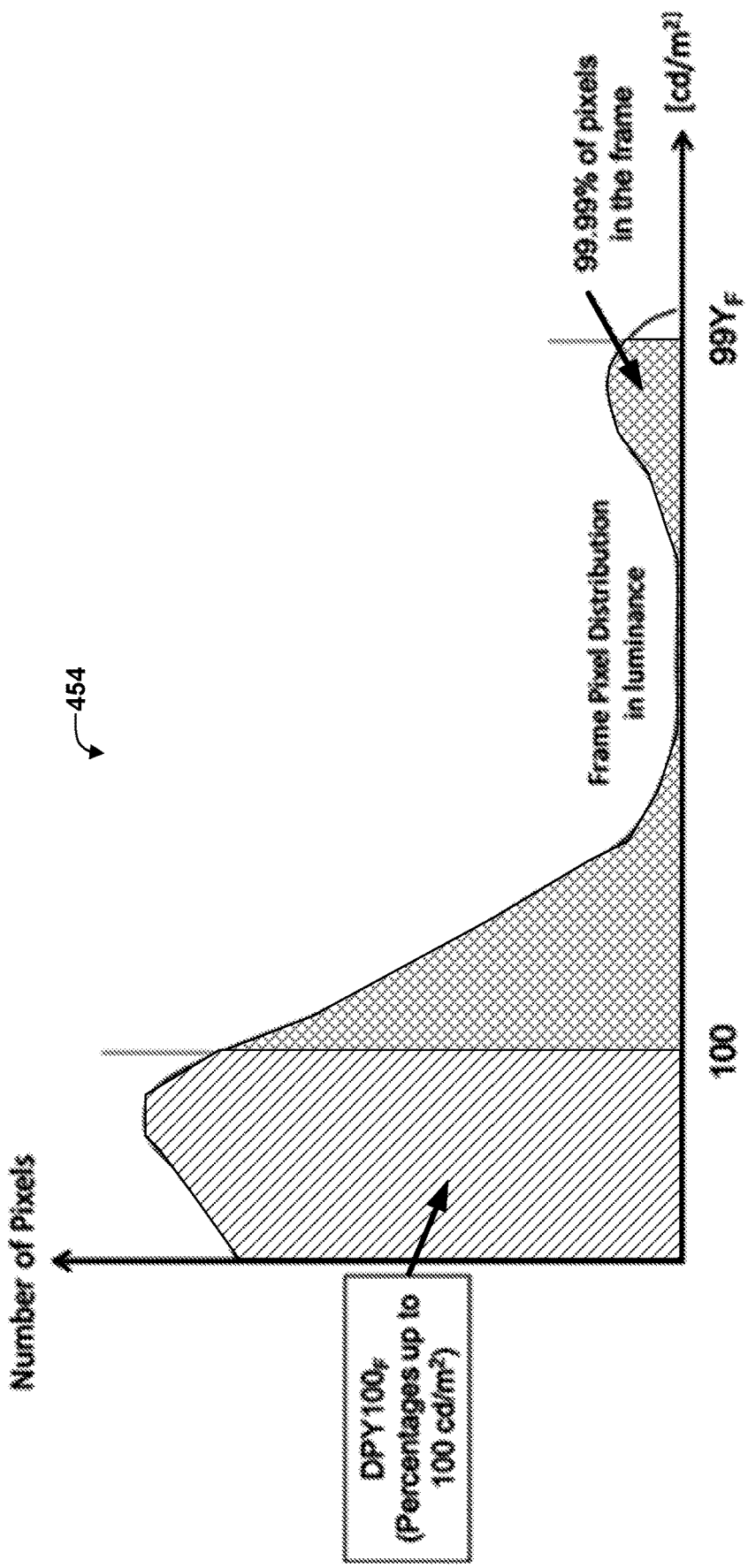
FIG. 10 is an example graph of histogram-based percentiles derivation DistributionY99 and DistributionY100.

FIG. 10 is an example graph 454 of histogram-based percentiles derivation DistributionY99 and DistributionY100. Further parameters include the DistributionY99 and DistributionY100 nits, which may be derived according to the derivation process visually depicted in FIG. 10. DistributionY99 value is the maximum value of 99YF values within a video scene. The 99YF value is derived as a value below which 99.99% of the linearized luminance values for each frame fall. The DistributionY100 nit value is an average value of DPY100F values within a scene. DistributionY100F is derived as a percentage, between 0 and 100, of accumulated number of pixels below and equal to 100 nits in luminance for each frame.

Figure 11:
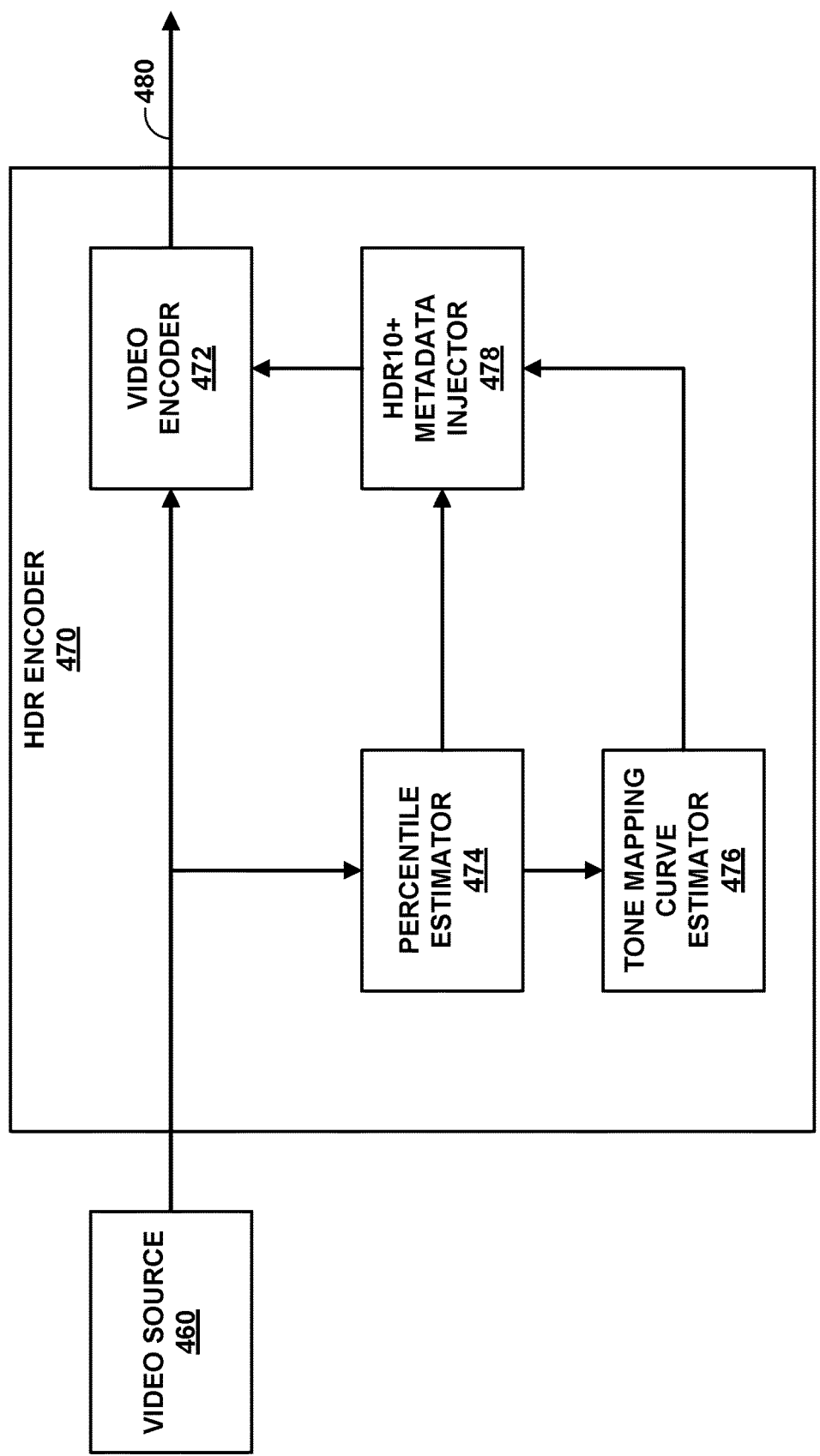
FIG. 11 is a block diagram illustrating an example HDR10+ capable live encoder framework.

FIG. 11 is a block diagram illustrating an example HDR10+ capable live encoder framework. In this example, FIG. 11 depicts video source 460 and HDR encoder 470. HDR encoder 470 includes video encoder 472, percentile estimator 474, tone mapping curve estimator 476, and HDR10+ metadata injector 478. In general, for HDR10+, statistical characteristics of video data generated or captured by video source 460 may be determined during content production and/or by HDR encoder 470. For example, HDR encoder 470 may generate statistical measurements over video data samples through a mathematical process and express results in terms of linearized RGB values. Tone mapping curve estimator 476 may then generate a tone mapping curve representing the calculated statistical measurements, and both the statistical measurements and tone mapping curve may be provided to HDR10+ metadata injector 478. HDR10+ metadata injector 478 may then generate metadata parameters representative of the statistical measurements and tone mapping curve and provide the metadata parameters to video encoder 472, which may encode the parameters along with the video data. Ultimately, video encoder 472 may generate bitstream 480 including the encoded video data and the encoded parameters.

In the case of live encoding, percentile estimator 474 may generate HDR10+ statistical characteristics of video data received from video source 460. Such statistical characteristics may be in PQ10 representation, including Y'CbCr 10 bits 4:2:0, BT.2100 PQ EOTF, and/or BT.2020 color containers. Statical information of SMPTE: "Dynamic Metadata for Color Volume Transformation—Application #4," Doc. ST 2094-40 (2016), Society of Motion Picture and Television Engineer, White Plains, NY, such as maximum and/or average values, as well as histogram percentiles being computed in non-linear Y'CbCr, allow low complexity implementation in fixed point arithmetic and relatively low memory requirements. A memory required to perform histogram derivation over 8 k UHD content could be limited to 1024 entries of 25 bits data. Conversion of the derived statistical parameters (to linearized RGB representation) can be done according to Equation (2) above, with accuracy required for HDR10+ syntax (accuracy up to 0.1 cd/m2).

However, in some applications, requirements may be imposed that HDR10+ statistical parameters need to be estimated in a color space that is different from the source color space. An example of such requirements could be computing statistical properties in P3-D65 color space, whereas the source is in BT.2100 (BT.2020 color space).

This disclosure recognizes that, as an alternative, a processing flow may additionally include application of PQ EOTF, RGB BT.2020 to RGB P3 color space conversion. The latter may be implemented in the linear RGB representation, and thus, may require >16 bits or even floating-point representation. Following this, video data statistics can be estimated either in linear RGB domain (alternative implementation 1) or in non-linear RGB representation (alternative implementation 2), which would require application of PQ OETF.

Each of these alternative implementations may introduce complications, contrasted with the techniques of this disclosure, as summarized below.

For alternative implementation 1, to achieve HDR10+ specified accuracy (0.1 cd/m2), computation of the histogram in the linear RGB domain would require allocation of the memory size of at least 2^17 of 25 bits entries. This is a significant memory increase, compared to the derivation of the histogram in nonlinear R'G'B' domain (2^10 of 25 bits entries). This disclosure recognizes, however, that an advantage of this method is that bins of the histgoram in LL can be directly used to produce HDR10+ syntax ellements without EOTF converison.

For alternative implementation 2, application of the PQ OETF on linear RGB would require LUT size of 2^16 entries with following statistics derivation in linear domain, and application of the PR EOTF to produce HDR10+ parameters. Additionally, color space conversion implemented with 16 bits fixed point arithmetic and supporting dynamical range of 0 . . . 2^10 cd/m2 would lead to quantization error of up to 0.17 cd/m2, which is higher than accuracy constrains of the HDR10+. Moreover, this quantization error in linear light representation may result in quantization error increase in PQ domain to up-to 30% of the value due to PQ OETF application. To reduce such quantization error, bit depth increase up to >18 bits per sample would be required. An additional disadvantage of this method is that histogram parameters (percentiles) to be derived from the histogram would need to be converted to the LL representation by applying a LUT.

The case of a live encoder framework is especially relevant for user generated or user captured content applications, which are usually deployed on computation platforms constrained on cost, memory, computation complexity, and power consumption, such as mobile devices. Therefore, the techniques of this disclosure may be particularly useful on mobile devices for providing HDR/WCG video data, because these techniques can be achieved in a low complexity, low memory environment, such as a mobile device.

Figure 12:
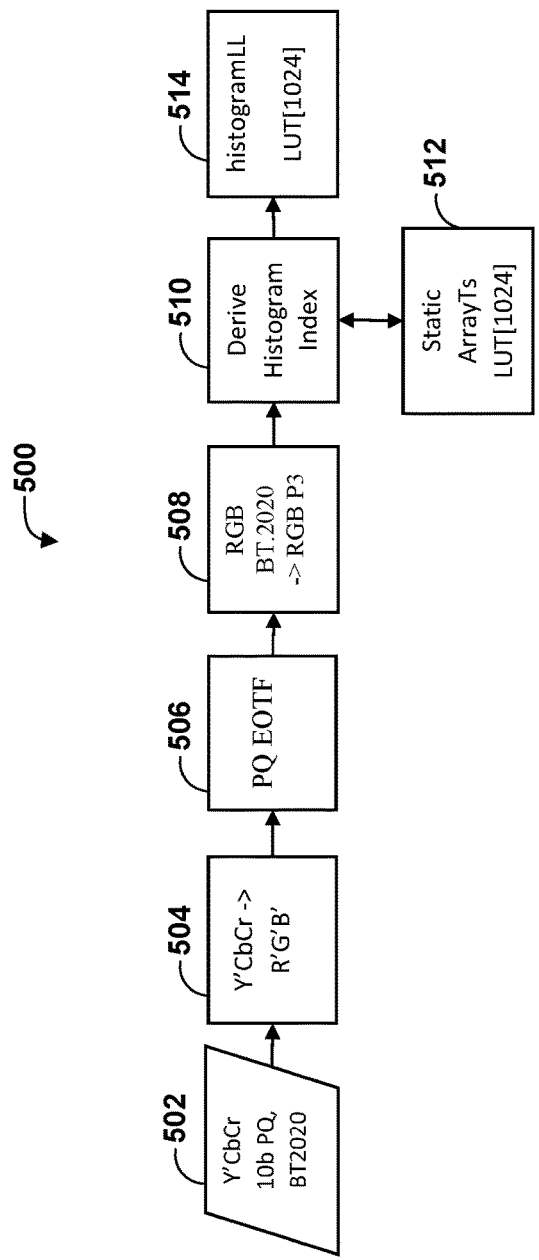
FIG. 12 is a conceptual diagram illustrating an example process according to the techniques of this disclosure for deriving HDR10+ statistical characteristics of video data.

FIG. 12 is a conceptual diagram illustrating an example process 500 according to the techniques of this disclosure for deriving HDR10+ statistical characteristics of video data. In this example, process 500 begins with receiving video data in Y'CbCr 10b PQ, BT2020 format 502. A color conversion process 504 converts the Y'CbCr format to R'G'B' format. PQ EOTF stage 506 then applies a transform function to the R'G'B' format data. A quantization stage 508 then converts the RGB BT.2020 format data to RGB P3 quantized values. A histogram calculation stage 510 may then derive a histogram index using static array look-up tables (LUTs) 512. Then a linear light histogram (histogramLL) may be represented in a 1024-entry LUT 514.

The techniques of this disclosure may perform low complexity, low memory estimation of the statistical properties (histogram) of the video data represented in linear light RGB domain. The histogram computation accuracy may be sufficient for HDR10+ parameter derivation (up to 0.1 cd/m2) without significant increases in memory requirements for computation complexity.

Process 500 may be performed by, e.g., HDR video encoding system 140 of FIG. 2. HDR statistics engine 132 may conduct a histogram estimation in linear light (LL) RGB domain, such that histogramLL[idx]++, idx=function (R,G,B). In some examples, a single histogramLL for RGB data is constructed over a single statistical characteristic, e.g., over a maximum of the 3 samples, where maxRGB=max(R,G,B); histogramLL[idx]++, idx=function (maxRGB).

Bins of the histogramLL may be aligned/associated to the linear light values represented by codewords in the non-linear RGB representation (R'G'B'), up to a certain accuracy. In some examples, the non-linearity may be BT.2100/PQ. In some examples, the accuracy is 0.1 cd/m2 accuracy, aligned to the HDR10+ specification. Thus, histogramLL[idx], idx=PQ_EOTF[maxRGB], with maxRGB being a maximum of the R',G' and B' codewords in the PQ domain.

Derivation of the histogramLL index may be conducted by mapping the LL RGB sample value to the histogram index through a non-linear or piece-wise linear mapping process. In one example, index derivation is conducted through a comparison of the LL RGB value against an array of the thresholds (ArrayTs) expressed in LL intensity values, sorted in ascending order, with maximal exceeded threshold provide an index to the histogram bin. In some examples, index derivation is conducted through a search over the array of thresholds, with a threshold providing minimal distance (e.g. SAD or MSE) from LL RGB value.

In some examples, with non-linear R'G'B' samples being represented with 10 bits codewords, number of the thresholds in ArrayTs utilized for comparison can be fewer or equal to the 1024. The PQ codewords space in LL representation may be redundant for the target accuracy, e.g. 0.1 cd/m2, and threshold values in the ArrayTs can be quantized to the number of unique levels, smaller than 1024.

In some examples, a search for the threshold with minimal distance, or comparison against the thresholds, can be conducted using a hybrid approach, with part of the index (indx1), or initial offset within ArrayTs, being derived from the RGB sample value analytically, e.g. as indx1=log 2(maxRGB), and another part of the index (indx2) through a search within a sub-range specified by the indx1. Such search can be implemented with a reduced number of comparators instead of 10 for LUT size of 1024, at the cost of memory increase of static LUT of 15 entries marking ArrayTs position with threshold values equal to power of 2.

In some examples, a histogram index can be derived analytically from an RGB value.

In some examples, derivation of the HDR10+ aligned parameters, namely histogram percentiles in LL representation, may be conducted by accessing provided ArrayTs LUT, instead of PQ EOTF applications.

Various example implementations are described below that are consistent with the various techniques of this disclosure.

In one example implementation, source video data is expressed in Y'CbCr 4:2:10 10 bits, PQ, BT.2020. A target color space for computing is HDR10+ with statistical properties RGB P3-D65. An output is the HDR10+ percentiles as shown in Table 2 above.

Static threshold LUT ArrayTs of size 1024 are determined in advance and provided as side information. Derivation may be conducted as follows:

Variable maxLL is set equal to 10000 cd/m2

Space of allowed 10 bit codewords in PQ RGB domain is cwPQ, where cwPQ is in the range from 0 to 1023, inclusive:

cw10=0:1023

The space of allowed, normalized PQ codwords (cw10n) is normalized to the range from 0 to 1, including dividing each element by 1024:

cw10n=cw10./$2^{10}$

The space of allowed normalized LL values (CWn) and LL in cd/m2 (CW), covered by the PQ codewords, are derived as follows, with the function being applied to every entry of the array separately:

CWn=PQ_EOTF(cw10n)

CW=WCn*maxLL

The space of allowed LL values, quantized to the HDR10+ required accuracy of 0.1 cd/m2, are derived as follows, with CW2 being LL values in cd/m2 and CW2n being normalized values in the range 0 . . . 1:

CW2=round(CW*10.0)/10/0

CW2n=WC2/maxRGB

The static LUT of thresholds in the target fixed point arithmetic implementation, e.g., 16 bits, is derived as follows:

numUpBits=16 qScaler=2^numUpBits

ArrayTs=round(CW2n*qScaler)

Each entry of the ArrayTs provides a LL value (threshold) associated with allowed PQ codewords in 10 bits representation and accuracy up-to 0.1 cd/m2.

To derive the histogram index from ArrayTs, HDR video encoding system 140 may be configured to do the following in this example:

Input:

Input samples are represented in the linear light R,G,B with 16 bits fixed point representation.

Variable maxRGB for each pixel is determined as a maximum of three components:

maxRGB=max(R,G,B)

In some examples, a lower bin boundary threshold can be used. The histogram index can be determined as maxRGB value being less or equal to a threshold value ArrayTs. The least ArrayTs index with threshold entry larger or equal to the maxRGB value provides an index for the histogram update:
idxHist=min(find(maxRGB<=ArrayTs))
histogramLL(idxHist)++

In some examples, an upper bin boundary threshold can be used. The histogram index bin can be determined as maxRGB value being larger or equal to a threshold value ArraysTs. The last found ArrayTs entry larger or equal to the maxRGB value provides an index for the histogram update.
idxHist=max(find(maxRGB>=ArrayTs))
histogramLL(idxHist)++

In some examples, a linear interpolation process can be used to determine histogram index position between lower and upper thresholds.
idxHist1=min(find(value<=pqThresholdsLL))
idxHist2=max(find(value>=pqThresholdsLL))
if(idxHist1 !=idxHist2)
 idxHist=round((idxHist1+idxHist2)/2)
else
 idxHist=idxHist1

In some examples, a binary search over the sorted array can be used. The worst-case complexity of such search for the LUT size of 1024 is 10 sequential comparisons.

In some examples, a hybrid search approach over the sorted array can be utilized. The initial offset for search can be derived from additional LUT specifying offset of position (OffsetLUT) to the ArrayTs. Access index to the OffsetLUT is derived as log 2(maxRGB) value. This mechanism would allow for a reduction in the number of comparisons for dyadic search from 10 to 7 in the case of a LUT of size 1024.

In some examples, the static LUT ArrayTs can be provided as side information. Calculation of LL RGB thresholds may be represented in 16 bits fixed point representation. In one example:
ArrayTs={0,1,1,1,1,1,1,1,1,1,1,1,1,1,1,1,1,1,1,1,1,1,1, 1,1,1,1,1,1,1,1,1,1,1,1,1,1,1,1,1,1,1,1,1,2, 2,2,2,2,2,2, 2,2,2,2,2,2,3,3,3,3,3,3,3,3,3,3,3,3,3,3,3,3,3,3,4,4,4,4, 4,4,4,4,5,5,5,5,5,5,5,5, 5,5,5,5,5,6,6,6,6,6,7,7,7,7,7,7, 7,7,7,8,8,8,8,8,9,9,9,9,9,9,9,9,10,10,10,10,10,10,10, 10,1 1,11,11,12,12,12,12,12,12,12,13,13,13,14,14,14, 14,14,15,15,15,16,16,16,16,16,17,17,1 7,18,18,18,18, 18,19,19,20,20,20,20,21,21,22,22,22,22,23,23,24,24, 24,24,25,25,26,26,2 6,27,27,28,28,28,29,29,29,29,30, 31,31,31,32,32,33,33,34,34,35,35,35,36,37,37,37,38,3 9,39,40,40,41,41,42,43,43,44,44,45,45,46,47,47,48,48, 49,50,50,51,52,52,53,54,54,55,5 6,56,57,58,58,60,60, 61,62,62,63,64,65,66,66,68,68,69,70,71,71,72,73,74, 75,76,77,78,7 9,80,81,82,83,84,85,86,87,88,89,90,91, 92,93,94,96,96,98,99,100,101,102,104,105,106, 107, 108,109,111,112,113,115,116,117,119,120,122,123, 125,126,127,128,130,132,133, 135,136,138,140,141, 142,144,145,147,149,151,152,154,156,157,159,161, 163,164,166, 168,170,172,174,176,178,180,182,184, 185,187,189,192,194,196,198,201,203,204,207, 209, 211,214,216,218,220,223,225,227,230,233,235,237, 240,242,245,248,250,253,256, 258,261,264,267,269, 273,275,278,281,284,287,290,293,296,299,302,305, 309,312,315, 319,322,325,328,332,335,338,342,345, 349,353,357,360,364,367,371,375,379,383,387, 391, 395,398,402,406,410,415,419,423,427,432,436,440, 445,450,454,458,463,468,473, 477,482,487,492,496, 501,507,511,516,522,527,532,537,543,548,553,559, 564,570,575, 581,587,593,598,604,611,617,623,628, 635,641,647,653,660,667,673,680,686,693,699, 706, 713,720,727,734,741,748,756,763,771,778,786,793, 801,809,817,824,832,840,848, 857,864,873,881,890, 898,907,916,924,933,942,951,960,969,978,988,997, 1007,1016,10 26,1035,1045,1056,1066,1075,1086, 1096,1107,1117,1128,1138,1149,1160,1171,1182, 1193,1205,1216,1227,1239,1250,1262,1274,1286, 1298,1310,1323,1335,1347,1361,137 3,1386,1399, 1412,1425,1439,1452,1465,1479,1493,1507,1521, 1535,1549,1564,1579,1 593,1608,1623,1638,1653, 1669,1684,1700,1716,1731,1748,1764,1780,1796, 1813,1830,1847,1864,1882,1899,1916,1934,1952, 1970,1988,2007,2025,2043,2062,2081,2100,21 20,2140,2159,2179,2199,2219,2240,2260,2281,2302, 2323,2344,2366,2387,2410,2432, 2454,2477,2499, 2522,2545,2568,2592,2616,2640,2664,2688,2713, 2737,2762,2788,281 3,2839,2865,2891,2917,2944, 2971,2998,3025,3053,3080,3108,3137,3165,3194, 3223,3 253,3282,3312,3342,3372,3403,3434,3465, 3496,3528,3561,3593,3625,3658,3692,3725,3758, 3793,3827,3861,3897,3932,3968,4004,4040,4076, 4113,4150,4188,4226,4264,43 02,4342,4381,4420, 4460,4501,4542,4582,4624,4666,4707,4750,4793, 4837,4880,4924, 4968,5014,5059,5104,5150,5197, 5244,5291,5339,5386,5435,5484,5534,5584,5634,568 561,6620,6680,6740,6801,6862,6923,6985,7048,7112, 7176,7240,7305,7371,7438,7505,7572,7640,7709, 7778,7848,7919,7989,8062,8134,8207,8281,8355, 8431,8507,8583,86 60,8738,8817,8896,8976,9056, 9138,9220,9303,9386,9471,9556,9642,9728,9816, 9904, 9994,10083,10174,10266,10357,10451,10545, 10640,10735,10832,10929,11028,11127, 11227, 11328,11429,11532,11637,11741,11847,11953,12061, 12169,12279,12390,1250 1,12614,12727,12842, 12957,13074,13192,13310,13430,13552,13673,13797, 13921,140 46,14173,14301,14430,14559,14691, 14824,14957,15092,15228,15366,15505,15644,15 785,15928,16071,16216,16363,16510,16660,16810, 16962,17115,17270,17426,17583,1 7743,17902, 18064,18228,18393,18559,18727,18896,19067,19240, 19414,19589,19767, 19946,20127,20309,20493, 20679,20866,21055,21246,21439,21633,21829,22027, 2222 7,22429,22632,22838,23045,23255,23466, 23679,23894,24111,24330,24552,24775,250 00,25227,25457,25689,25923,26159,26397,26638, 26880,27125,27372,27622,27874,28 128,28384, 28644,28905,29169,29435,29704,29976,30249,30525, 30805,31086,31371,3 1658,31947,32240,32535, 32833,33133,33437,33743,34053,34364,34680,34998, 35319, 35643,35971,36301,36634,36971,37310, 37654,38000,38349,38702,39058,39418,3978 1,40147,40517,40891,41267,41648,42032,42420, 42811,43207,43606,44009,44415,448 26,45240, 45658,46081,46508,46938,47373,47811,48254,48702, 49153,49609,50070,50 534,51003,51477,51955, 52438,52926,53418,53915,54417,54923,55434,55951, 56472,5 6999,57530,58067,58609,59155,59708, 60266,60829,61397,61971,62551,63137,63728, 64325,64927}.

In some examples, the static LUT ArrayTs can be provided as a side information. Calculation of LL RGB thresholds may be represented in 17 bits fixed point representation. For example:
ArrayTs={0,0,0,0,0,0,0,0,0,0,0,0,0,0,0,0,0,0,0,0,0,0,0, 0,0,0,0,0,0,0,0,0,0,0,0,0,0,0,0,0,0,0,0,0,0,0, 4,4,4,4,4,4, 4,4,4,4,4,4,5,5,5,5,5,5,5,5,7,7,7,7,7,7,7,7,8,8,8,8, 8,8,8,8,9,9,9,9,9,9,1 7,17,18,18,18,18,20,20,20,20, 21,21,21,21,22,22,22,24,24,24,24,25,25,25,26,26,26, 28,2 8,28,29,29,30,30,30,31,31,31,33,33,34,34,34,35, 35,37,37,37,38,38,39,39,41,41,42,42,4 3,43,45,45,46, 46,47,47,48,48,50,50,51,51,52,54,54,55,55,56,58,58, 59,59,60,62,62,63,6 4,64,66,67,68,68,69,71,71,72,73, 75,75,76,77,79,80,80,81,83,84,85,87,88,88,89,90,92,9 3,94,96,97,98,100,101,102,104,105,106,107,109,110, 111,113,114,115,117,119,121,122,123,125,126,128, 130,131,132,135,136,138,140,142,143,144,147,148, 151,152,153,156, 157,160,161,164,165,168,169,172, 173,176,178,180,182,184,186,189,191,193,195,198, 201,202,204,207,210,212,215,216,219,222,224,227, 229,232,235,237,240,244,246,249, 252,254,257,261, 263,266,270,273,275,279,282,284,288,291,295,298, 301,304,308,312, 315,319,322,325,329,333,337,341, 343,347,351,355,359,363,367,371,375,379,384,388, 392,396,401,405,409,414,418,422,427,431,436,440, 446,451,455,460,465,471,474,480, 485,490,495,501, 506,511,516,523,528,533,539,545,551,556,562,568, 574,579,586,592, 598,604,611,617,624,630,637,644, 650,657,663,670,676,684,691,699,705,713,720,727, 734,742,750,758,765,773,781,789,797,805,813,821, 830,838,847,855,864,872,881,890, 899,908,916,925, 936,945,954,963,974,983,992,1003,1013,1022,1033, 1043,1054,1064, 1075,1085,1096,1106,1118,1129, 1140,1151,1163,1174,1186,1197,1208,1222,1233,124 455,1468,1482,1497,1511,1526,1541,1556,1572,1586, 1602,1617,1633,1649,1665,1680,1696,1713,1729, 1746,1763,1780,1797,1814,1831,1848,1866,1884, 1902,1920,1939,19 57,1975,1995,2013,2033,2053, 2071,2091,2112,2131,2151,2172,2193,2214,2233, 2256, 2277,2298,2320,2342,2365,2387,2409,2431, 2455,2477,2501,2524,2548,2572,2597,262 0,2645, 2670,2695,2721,2746,2772,2797,2823,2851,2877, 2903,2931,2958,2986,3013,3 042,3070,3099,3127, 3158,3186,3217,3245,3277,3307,3337,3369,3400, 3431,3463,3496,3527,3560,3593,3627,3661,3694, 3728,3763,3797,3833,3868,3903,3940,3977,4013,40 50,4087,4125,4163,4201,4240,4280,4319,4358,4399, 4438,4480,4521,4563,4605,4647, 4688,4732,4775, 4820,4864,4909,4953,4998,5044,5091,5137,5184, 5231,5280,5328,537 7,5425,5475,5525,5576,5627, 5678,5729,5782,5834,5888,5941,5995,6050,6105, 6160,6 217,6273,6331,6388,6446,6505,6564,6624, 6683,6745,6807,6868,6930,6993,7057,7121,7185, 7251,7316,7383,7450,7517,7585,7655,7723,7794, 7864,7935,8007,8079,8153,82 26,8301,8376,8452, 8529,8605,8684,8762,8841,8921,9002,9083,9165, 9247,9331,9415, 9500,9587,9673,9760,9849,9937, 10027,10117,10208,10301,10394,10487,10581,10677, 10773,10870,10968,11068,11167,11268,11369,11471, 11575,11679,11785,11891,1199 7,12106,12215, 12325,12436,12548,12660,12774,12890,13005,13123, 13241,13360,134 79,13601,13723,13846,13971, 14097,14224,14352,14481,14611,14743,14875,15009, 15 144,15280,15418,15556,15696,15837,15979, 16123,16269,16414,16562,16710,16861,1 7013, 17165,17320,17476,17633,17792,17952,18113,18275, 18439,18606,18772,18941, 19112,19283,19456, 19632,19809,19987,20167,20348,20531,20715,20902, 21089,2128 06,24121,24339,24558,24779,25002, 25227,25454,25684,25914,26148,26383,26621,26 861,27103,27347,27593,27842,28093,28346,28601, 28859,29119,29382,29647,29915,3 0185,30456, 30731,31009,31288,31570,31856,32143,32432,32726, 33021,33320,33620, 33924,34231,34540,34852, 35167,35485,35805,36129,36455,36785,37118,37454, 3779 2,38134,38480,38827,39179,39534,39892, 40254,40618,40986,41357,41732,42111,424 92,42878,43266,43659,44055,44454,44858,45264, 45676,46090,46510,46932,47358,47 789,48223, 48660,49104,49550,50000,50455,50915,51378,51846, 52317,52794,53276,5 3760,54251,54745,55244, 55748,56256,56769,57288,57809,58338,58870,59408, 59951, 60499,61051,61609,62173,62742,63316, 63895,64480,65069,65666,66266,66874,6748 6,68105,68729,69359,69996,70639,71286,71941, 72602,73268,73942,74621,75307,759 99,76698, 77405,78116,78836,79562,80295,81034,81781,82535, 83296,84064,84840,85 623,86413,87211,88017, 88830,89652,90480,91317,92162,93015,93876,94745, 95622,9 6508,97404,98307,99219,100139,101068, 102007,102954,103910,104876,105851,1068 311, 119416,120531,121658,122795,123943,125103, 126273,127456,128650,129854}.

The following pseudocode represents an example implementation of static LUT ArrayTs construction:

```
int*constructPQThresholdsLL(int input_bitdepth, int system_bitdepth)
{
    int maxValueLL=10000; //10 k cd/m2
    int maxValueInput=(1<<input_bitdepth);
    int maxValueSystem=(1<<system_bitdepth);
    int lengthArray=1<<input_bitdepth;
    int*thresholdsArrayLL=(int*)malloc
        (lengthArray*sizeof(int));
    for (int i=0; i<lengthArray; i++)
    {
        double value=(double)i/maxValueInput;  //normalized pq to 0 . . . 1
        value=PQ EOTF(value); //normalized LL 0 . . . 1
        value=value*maxValueLL; //LL 0 . . . 10000
        value=(double)((int)(10.0*value+0.5))/(double)10;
            //quantize LL to 0.1 cd/m2
        value=value/maxValueLL; //normalized LL 0 . . . 1
        value=(int)(value*maxValueSystem+0.5);    //LL
            value normalized to fixed point representation in
            system
        value=value>maxValueSystem? maxValueSystem:
            value;
        value=value<0? 0: value;
        thresholdsArrayLL[i]=(int) value;
    }
    return thresholdsArrayLL;
}
```

The following pseudocode represents an example implementation for constructing a histogram in linear light:

```
int*derivePQHistogramLL(int*input_data, int numInputPoints, int*thresholdsArrayLL, int numThresholds)
{
    int*output_histogram=(int*)malloc
        (numInputPoints*sizeof(int)); //memset(output histogram, 0, numInputPoints*sizeof(int));
    for (int i=0; i<numInputPoints; i++)
    {
        int value=input_data[i];
        int j=0;
        while    (value>thresholdsArrayLL[j]    &&
            j<numThresholds)
        {
            j++;
        }
        output_histogram[j]++;
    }
    return output_histogram;
}
```

The techniques of this disclosure may allow for a low complexity and low memory implementation of histogram calculation in a linear light RGB domain with granularity compatible with non-linear representation in PQ domain while still satisfying HDR10+ requirements on accuracy.

Various examples of the techniques of this disclosure are expressed in the following clauses:

Clause 1: A method of encoding high dynamic range (HDR) video data, the method comprising: calculating a histogram for an image of video data, the image being expressed in a linear light format; encoding values for the histogram of the image expressed in the linear light format; and encoding the image.

Clause 2: The method of clause 1, wherein calculating the histogram comprises: forming a plurality of bins for the histogram, each of the bins corresponding to a respective range of ranges of linear light values of the image, wherein a first bin of the plurality of bins corresponds to a first range of the ranges linear light values having a first width, and a second bin of the plurality of bins corresponds to a second range of the ranges of linear light values, the first width being different than the second width; and for each of the plurality of bins, calculating a number of samples of the image within the corresponding range of the ranges of linear light values.

Clause 3: The method of clause 2, wherein encoding the values for the histogram comprises, for each of the plurality of bins, determining a respective codeword representing the number of samples of the image within the corresponding range of the ranges of linear light values.

Clause 4: The method of clause 3, wherein determining the respective codeword comprises selecting the respective codeword from a set of codewords for a PQ10 format for HDR images.

Clause 5: The method of clause 3, wherein determining the respective codeword comprises: forming a set of linear light codewords as a subset of a set codewords for a PQ10 format for HDR images, the set of linear light codewords being smaller than the set of codewords for the PQ10 format for HDR images; and selecting the respective codeword from the set of linear light codewords.

Clause 6: The method of clause 1, wherein calculating the histogram comprises forming an array of variables having a size of 210×18 bits representing data for the histogram.

Clause 7: The method of clause 1, wherein encoding the image comprises: converting the image to a luminance, blue-hue chrominance, and red-hue chrominance (YUV) format image; and encoding the YUV format image.

Clause 8: The method of clause 1, further comprising forming a bitstream including data for the encoded image and data for the encoded values of the histogram.

Clause 9: A device for encoding high dynamic range (HDR) video data, the device comprising: a memory configured to store video data; and one or more processors implemented in circuitry and configured to: calculate a histogram for an image of the video data, the image being expressed in a linear light format; encode values for the histogram of the image expressed in the linear light format; and encode the image.

Clause 10: The device of clause 9, wherein to calculate the histogram, the one or more processors are configured to: form a plurality of bins for the histogram, each of the bins corresponding to a respective range of ranges of linear light values of the image, wherein a first bin of the plurality of bins corresponds to a first range of the ranges linear light values having a first width, and a second bin of the plurality of bins corresponds to a second range of the ranges of linear light values, the first width being different than the second width; and for each of the plurality of bins, calculate a number of samples of the image within the corresponding range of the ranges of linear light values.

Clause 11: The device of clause 10, wherein to encode the values for the histogram, the one or more processors are configured to, for each of the plurality of bins, determine a respective codeword representing the number of samples of the image within the corresponding range of the ranges of linear light values.

Clause 12: The device of clause 11, wherein to determine the respective codeword, the one or more processors are configured to select the respective codeword from a set of codewords for a PQ10 format for HDR images.

Clause 13: The device of clause 11, wherein to determine the respective codeword, the one or more processors are configured to: form a set of linear light codewords as a subset of a set codewords for a PQ10 format for HDR images, the set of linear light codewords being smaller than the set of codewords for the PQ10 format for HDR images; and select the respective codeword from the set of linear light codewords.

Clause 14: The device of clause 9, wherein calculating the histogram comprises forming an array of variables having a size of 210×18 bits representing data for the histogram.

Clause 15: The device of clause 9, wherein encoding the image comprises: converting the image to a luminance, blue-hue chrominance, and red-hue chrominance (YUV) format image; and encoding the YUV format image.

Clause 16: The device of clause 9, further comprising forming a bitstream including data for the encoded image and data for the encoded values of the histogram.

Clause 17: The device of clause 9, wherein the device comprises one or more of a camera, a computer, a mobile device, a broadcast receiver device, or a set-top box.

Clause 18: A device for encoding high dynamic range (HDR) video data, the device comprising: means for calculating a histogram for an image of video data, the image being expressed in a linear light format; means for encoding values for the histogram of the image expressed in the linear light format; and means for encoding the image.

Clause 19: The device of clause 18, wherein the means for calculating the histogram comprises: means for forming a plurality of bins for the histogram, each of the bins corresponding to a respective range of ranges of linear light values of the image, wherein a first bin of the plurality of bins corresponds to a first range of the ranges linear light values having a first width, and a second bin of the plurality of bins corresponds to a second range of the ranges of linear light values, the first width being different than the second width; and means for calculating, for each of the plurality of bins, a number of samples of the image within the corresponding range of the ranges of linear light values.

Clause 20: The device of clause 19, wherein the means for encoding the values for the histogram comprises means for determining, for each of the plurality of bins, a respective codeword representing the number of samples of the image within the corresponding range of the ranges of linear light values.

Clause 21: The device of clause 20, wherein the means for determining the respective codeword comprises means for selecting the respective codeword from a set of codewords for a PQ10 format for HDR images.

Clause 22: The device of clause 20, wherein the means for determining the respective codeword comprises: means for forming a set of linear light codewords as a subset of a set codewords for a PQ10 format for HDR images, the set of linear light codewords being smaller than the set of codewords for the PQ10 format for HDR images; and means for selecting the respective codeword from the set of linear light codewords.

Clause 23: The device of clause 18, wherein the means for calculating the histogram comprises means for forming an array of variables having a size of 210×18 bits representing data for the histogram.

Clause 24: The device of clause 18, wherein the means for encoding the image comprises: means for converting the image to a luminance, blue-hue chrominance, and red-hue chrominance (YUV) format image; and means for encoding the YUV format image.

Clause 25: The device of clause 18, further comprising means for forming a bitstream including data for the encoded image and data for the encoded values of the histogram.

Clause 26: A method of encoding high dynamic range (HDR) video data, the method comprising: calculating a histogram for an image of video data, the image being expressed in a linear light format; encoding values for the histogram of the image expressed in the linear light format; and encoding the image.

Clause 27: The method of clause 26, wherein calculating the histogram comprises: forming a plurality of bins for the histogram, each of the bins corresponding to a respective range of ranges of linear light values of the image, wherein a first bin of the plurality of bins corresponds to a first range of the ranges linear light values having a first width, and a second bin of the plurality of bins corresponds to a second range of the ranges of linear light values, the first width being different than the second width; and for each of the plurality of bins, calculating a number of samples of the image within the corresponding range of the ranges of linear light values.

Clause 28: The method of clause 27, wherein encoding the values for the histogram comprises, for each of the plurality of bins, determining a respective codeword representing the number of samples of the image within the corresponding range of the ranges of linear light values.

Clause 29: The method of clause 28, wherein determining the respective codeword comprises selecting the respective codeword from a set of codewords for a PQ10 format for HDR images.

Clause 30: The method of clause 28, wherein determining the respective codeword comprises: forming a set of linear light codewords as a subset of a set codewords for a PQ10 format for HDR images, the set of linear light codewords being smaller than the set of codewords for the PQ10 format for HDR images; and selecting the respective codeword from the set of linear light codewords.

Clause 31: The method of any of clauses 26-30, wherein calculating the histogram comprises forming an array of variables having a size of 210×18 bits representing data for the histogram.

Clause 32: The method of any of clauses 26-31, wherein encoding the image comprises: converting the image to a luminance, blue-hue chrominance, and red-hue chrominance (YUV) format image; and encoding the YUV format image.

Clause 33: The method of any of clauses 26-32, further comprising forming a bitstream including data for the encoded image and data for the encoded values of the histogram.

Clause 34: A device for encoding high dynamic range (HDR) video data, the device comprising: a memory configured to store video data; and one or more processors implemented in circuitry and configured to: calculate a histogram for an image of the video data, the image being expressed in a linear light format; encode values for the histogram of the image expressed in the linear light format; and encode the image.

Clause 35: The device of clause 34, wherein to calculate the histogram, the one or more processors are configured to: form a plurality of bins for the histogram, each of the bins corresponding to a respective range of ranges of linear light values of the image, wherein a first bin of the plurality of bins corresponds to a first range of the ranges linear light values having a first width, and a second bin of the plurality of bins corresponds to a second range of the ranges of linear light values, the first width being different than the second width; and for each of the plurality of bins, calculate a number of samples of the image within the corresponding range of the ranges of linear light values.

Clause 36: The device of clause 35, wherein to encode the values for the histogram, the one or more processors are configured to, for each of the plurality of bins, determine a respective codeword representing the number of samples of the image within the corresponding range of the ranges of linear light values.

Clause 37: The device of clause 36, wherein to determine the respective codeword, the one or more processors are configured to select the respective codeword from a set of codewords for a PQ10 format for HDR images.

Clause 38: The device of clause 36, wherein to determine the respective codeword, the one or more processors are configured to: form a set of linear light codewords as a subset of a set codewords for a PQ10 format for HDR images, the set of linear light codewords being smaller than the set of codewords for the PQ10 format for HDR images; and select the respective codeword from the set of linear light codewords.

Clause 39: The device of any of clauses 34-38, wherein calculating the histogram comprises forming an array of variables having a size of 210×18 bits representing data for the histogram.

Clause 40: The device of any of clauses 34-39, wherein encoding the image comprises: converting the image to a luminance, blue-hue chrominance, and red-hue chrominance (YUV) format image; and encoding the YUV format image.

Clause 41: The device of any of clauses 34-40, further comprising forming a bitstream including data for the encoded image and data for the encoded values of the histogram.

Clause 42: The device of any of clauses 34-41, wherein the device comprises one or more of a camera, a computer, a mobile device, or a broadcast sending device.

Clause 43: A device for encoding high dynamic range (HDR) video data, the device comprising: means for calculating a histogram for an image of video data, the image being expressed in a linear light format; means for encoding values for the histogram of the image expressed in the linear light format; and means for encoding the image.

Clause 44: The device of clause 43, wherein the means for calculating the histogram comprises: means for forming a plurality of bins for the histogram, each of the bins corresponding to a respective range of ranges of linear light values of the image, wherein a first bin of the plurality of bins corresponds to a first range of the ranges linear light values having a first width, and a second bin of the plurality of bins corresponds to a second range of the ranges of linear light values, the first width being different than the second width; and means for calculating, for each of the plurality of bins, a number of samples of the image within the corresponding range of the ranges of linear light values.

Clause 45: The device of clause 44, wherein the means for encoding the values for the histogram comprises means for determining, for each of the plurality of bins, a respective codeword representing the number of samples of the image within the corresponding range of the ranges of linear light values.

Clause 46: The device of clause 45, wherein the means for determining the respective codeword comprises means for selecting the respective codeword from a set of codewords for a PQ10 format for HDR images.

Clause 47: The device of clause 45, wherein the means for determining the respective codeword comprises: means for forming a set of linear light codewords as a subset of a set codewords for a PQ10 format for HDR images, the set of linear light codewords being smaller than the set of codewords for the PQ10 format for HDR images; and means for selecting the respective codeword from the set of linear light codewords.

Clause 48: The device of any of clauses 43-47, wherein the means for calculating the histogram comprises means for forming an array of variables having a size of 210×18 bits representing data for the histogram.

Clause 49: The device of any of clauses 43-48, wherein the means for encoding the image comprises: means for converting the image to a luminance, blue-hue chrominance, and red-hue chrominance (YUV) format image; and means for encoding the YUV format image.

Clause 50: The device of any of clauses 43-49, further comprising means for forming a bitstream including data for the encoded image and data for the encoded values of the histogram.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding high dynamic range (HDR) video data, the method comprising:
  calculating a histogram for an image of video data, the image being expressed in a linear light format, wherein calculating the histogram comprises:
    forming a plurality of bins for the histogram, each of the bins corresponding to a respective range of ranges of linear light values of the image, wherein a first bin of the plurality of bins corresponds to a first range of the ranges of linear light values having a first width, and a second bin of the plurality of bins corresponds to a second range of the ranges of linear light values, the first width being different than the second width; and
    for each of the plurality of bins, calculating a number of samples of the image within the corresponding range of the ranges of linear light values;
  extracting one or more parameters of the histogram;
  encoding the one or more parameters of the histogram of the image expressed in the linear light format, wherein encoding the one or more parameters of the histogram comprises, for one or more of the plurality of bins, determining a respective codeword representing the number of samples of the image within the corresponding range of the ranges of linear light values,
wherein determining the respective codeword comprises:
   forming a set of linear light codewords as a subset of a set codewords for a Perceptual Quantizer (PQ) format for HDR images, the set of linear light codewords being smaller than the set of codewords for the PQ format for HDR images and represented using a fixed number of bits; and
   selecting the respective codeword from the set of linear light codewords; and
encoding the image.

2. The method of claim 1, wherein one or more of the bins correspond to different ranges of the ranges of linear light values having equal widths.

3. The method of claim 1, wherein determining the respective codeword comprises selecting the respective codeword from a set of codewords for a non-linear function.

4. The method of claim 3, wherein the non-linear function comprises an ST.2084 PQ non-linear function, or a PQ10 non-linear function.

5. The method of claim 1, wherein the fixed number of bits comprises 7 bits.

6. The method of claim 1, wherein calculating the histogram comprises forming an array of variables having a size of $2^{10} \times 18$ bits representing data for the histogram.

7. The method of claim 1, wherein encoding the image comprises:
   converting the image to a luminance, blue-hue chrominance, and red-hue chrominance (YUV) format image; and
   encoding the YUV format image.

8. The method of claim 1, further comprising forming a bitstream including data for the encoded image and data for the encoded one or more parameters of the histogram.

9. A device for encoding high dynamic range (HDR) video data, the device comprising:
   a memory configured to store histogram data; and
   one or more processors implemented in circuitry and configured to:
      calculate a histogram for an image of video data, the image being expressed in a linear light format, wherein to calculate the histogram, the one or more processors are configured to:
         form a plurality of bins for the histogram, each of the bins corresponding to a respective range of ranges of linear light values of the image, wherein a first bin of the plurality of bins corresponds to a first range of the ranges of linear light values having a first width, and a second bin of the plurality of bins corresponds to a second range of the ranges of linear light values, the first width being different than the second width; and
      for each of the plurality of bins, calculate a number of samples of the image within the corresponding range of the ranges of linear light values;
      extract one or more parameters of the histogram;
      encode the one or more parameters of the histogram of the image expressed in the linear light format, wherein to encode the one or more parameters of the histogram, the one or more processors are configured to:
         for one or more of the plurality of bins, determine a respective codeword representing the number of samples of the image within the corresponding range of the ranges of linear light values and wherein to determine the respective codeword, the one or more processors are configured to:
         form a set of linear light codewords as a subset of a set codewords for a Perceptual Quantizer (PQ) format for HDR images, the set of linear light codewords being smaller than the set of codewords for the PQ format for HDR images and represented using a fixed number of bits; and
         select the respective codeword from the set of linear light codewords; and
      encode the image.

10. The device of claim 9, wherein one or more of the bins correspond to different ranges of the ranges of linear light values having equal widths.

11. The device of claim 9, wherein to determine the respective codeword, the one or more processors are configured to select the respective codeword from a set of codewords for a non-linear function.

12. The device of claim 11, wherein the non-linear function comprises an ST.2084 PQ non-linear function, or a PQ10 non-linear function.

13. The device of claim 9, wherein the fixed number of bits comprises 7 bits.

14. The device of claim 9, wherein calculating the histogram comprises forming an array of variables having a size of $2^{10} \times 18$ bits representing data for the histogram.

15. The device of claim 9, wherein encoding the image comprises:
   converting the image to a luminance, blue-hue chrominance, and red-hue chrominance (YUV) format image; and
   encoding the YUV format image.

16. The device of claim 9, further comprising forming a bitstream including data for the encoded image and data for the encoded one or more parameters of the histogram.

17. The device of claim 9, wherein the device comprises one or more of a camera, a computer, a mobile device, a broadcast receiver device, or a set-top box.

18. A device for encoding high dynamic range (HDR) video data, the device comprising:
   means for calculating a histogram for an image of video data, the image being expressed in a linear light format wherein the means for calculating the histogram comprises:
      means for forming a plurality of bins for the histogram, each of the bins corresponding to a respective range of ranges of linear light values of the image, wherein a first bin of the plurality of bins corresponds to a first range of the ranges of linear light values having a first width, and a second bin of the plurality of bins corresponds to a second range of the ranges of linear light values, the first width being different than the second width; and
      means for, for each of the plurality of bins, calculating a number of samples of the image within the corresponding range of the ranges of linear light values;
   means for extracting one or more parameters of the histogram;
   means for encoding the one or more parameters of the histogram of the image expressed in the linear light format, wherein the means for encoding the one or more parameters of the histogram comprises, means for, for one or more of the plurality of bins, determining a respective codeword representing the number of samples of the image within the corresponding range of the ranges of linear light values, wherein the means for determining the respective codeword comprises:
   means for forming a set of linear light codewords as a subset of a set codewords for a Perceptual Quantizer (PQ) format for HDR images, the set of linear light codewords being smaller than the set of codewords for the PQ format for HDR images and represented using a fixed number of bits; and
   means for selecting the respective codeword from the set of linear light codewords; and
means for encoding the image.

* * * * *